US011213054B2

(12) United States Patent
Hubbard et al.

(10) Patent No.: US 11,213,054 B2
(45) Date of Patent: Jan. 4, 2022

(54) COATED PRODUCT FORM

(71) Applicant: Terramera Exco Holdings Ltd., Vancouver (CA)

(72) Inventors: Hayley Louise Hubbard, Winchester (GB); Igor Curcic, Winchester (GB); Aoife Dillon, Winchester (GB); Jane Terry, Winchester (GB)

(73) Assignee: Terramera Exco Holdings Ltd., Vancouver (CA)

( * ) Notice: Subject to any disclaimer, the term of this patent is extended or adjusted under 35 U.S.C. 154(b) by 0 days.

(21) Appl. No.: 16/333,949

(22) PCT Filed: Sep. 15, 2017

(86) PCT No.: PCT/EP2017/073355
§ 371 (c)(1),
(2) Date: Mar. 15, 2019

(87) PCT Pub. No.: WO2018/050860
PCT Pub. Date: Mar. 22, 2018

(65) Prior Publication Data
US 2019/0200644 A1 Jul. 4, 2019

(30) Foreign Application Priority Data
Sep. 15, 2016 (GB) .................... 1615711

(51) Int. Cl.
A23K 40/30 (2016.01)
C05F 11/08 (2006.01)
(Continued)

(52) U.S. Cl.
CPC .............. *A23K 40/30* (2016.05); *A23K 10/18* (2016.05); *A23K 10/30* (2016.05); *A23K 10/33* (2016.05);
(Continued)

(58) Field of Classification Search
None
See application file for complete search history.

(56) References Cited

U.S. PATENT DOCUMENTS 6,761,899 B1 * 7/2004 Winstrom ............... C12P 29/00
424/409
9,540,291 B2 * 1/2017 Wheeler ................. C05D 9/02
(Continued)

FOREIGN PATENT DOCUMENTS

EP 0297426 A2 1/1989
EP 0357559 B1 10/1994
(Continued)

OTHER PUBLICATIONS

Dibner et al., Antibiotic growth promoters in agriculture: history and mode of action Poultry Science, 84, 634-643. 2005.
(Continued)

*Primary Examiner* — Wayne A Langel
(74) *Attorney, Agent, or Firm* — Oyen Wiggs Green & Mutala LLP

(57) ABSTRACT

A product form comprises an inanimate substrate comprising i) an active agent; and ii) carrier particles including at least an outer surface comprising an organic matter constituent, wherein the said active agent is combined within and/or on the surface of the carrier particles, the carrier particles being a) in dry, particulate form and carrying at least an electrostatic surface charge, and b) being at least substantially uniformly distributed over the outer surface of the substrate.

16 Claims, 10 Drawing Sheets

(51) Int. Cl.
*C05G 3/60* (2020.01)
*C05G 5/30* (2020.01)
*C05B 17/00* (2006.01)
*C05C 9/00* (2006.01)
*C05C 1/00* (2006.01)
*A23K 40/20* (2016.01)
*A23K 10/18* (2016.01)
*A23K 10/33* (2016.01)
*A23K 10/30* (2016.01)
*A23K 20/158* (2016.01)
*A23K 50/20* (2016.01)

(52) U.S. Cl.
CPC ............ *A23K 20/158* (2016.05); *A23K 40/20* (2016.05); *A23K 50/20* (2016.05); *C05B 17/00* (2013.01); *C05C 1/00* (2013.01); *C05C 9/005* (2013.01); *C05F 11/08* (2013.01); *C05G 3/60* (2020.02); *C05G 5/30* (2020.02); *C05G 5/37* (2020.02); *C05G 5/38* (2020.02); *Y02P 20/145* (2015.11); *Y02P 60/87* (2015.11)

(56) References Cited

U.S. PATENT DOCUMENTS

| | | | |
|---|---|---|---|
| 9,801,370 B2 | 10/2017 | Jessop et al. | |
| 9,961,894 B2 | 5/2018 | Jessop | |
| 10,029,952 B2* | 7/2018 | Jessop | C05F 11/10 |
| 2003/0215657 A1 | 11/2003 | Tijsma et al. | |
| 2010/0303968 A1 | 12/2010 | Sunvoid et al. | |
| 2011/0027416 A1* | 2/2011 | Sunvoid | A23K 40/30 426/61 |
| 2011/0027417 A1* | 2/2011 | Corrigan | A23K 10/18 426/61 |
| 2011/0027418 A1* | 2/2011 | Horgan | A23K 50/42 426/61 |
| 2011/0027419 A1* | 2/2011 | Sunvoid | A23K 10/18 426/61 |
| 2011/0077155 A1* | 3/2011 | Goodwin | C05C 9/005 504/101 |
| 2015/0376076 A1* | 12/2015 | Ward | C05D 9/02 71/23 |
| 2016/0264486 A1* | 9/2016 | McIlrath | C05G 5/30 |
| 2016/0355443 A1* | 12/2016 | Burnham | C05D 1/005 |
| 2017/0044075 A1* | 2/2017 | Goodwin | C05G 5/30 |

FOREIGN PATENT DOCUMENTS

| | | |
|---|---|---|
| EP | 0888048 B1 | 9/2001 |
| GB | 2481307 A | 12/2011 |
| GB | 2490242 A | 10/2012 |
| GB | 2490247 A | 10/2012 |
| GB | 2490248 A | 10/2012 |
| GB | 2490243 B | 2/2015 |
| GB | 2482900 B | 4/2016 |
| WO | 2008/062221 A2 | 5/2008 |
| WO | 2016/113665 A1 | 7/2016 |
| WO | 2017/017234 A1 | 2/2017 |

OTHER PUBLICATIONS

Mathur et al., Antibiotic resistance in food lactic acid bacteria A review. International Journal of Food Microbiology, 105, 281-295. 2005.

Salyers et al., Human intestinal bacteria as reservoirs for antibiotics resistance genes. TRENDS in Microbiology vol. 12 No. Sep. 9, 2004.

Verstegen et al., Alternatives to the use of antibiotics as growth promoters for monogastric animals. Anim. Biotechnol., 13, 113-127. 2002.

Buntyn et al., The Role of Direct-Fed Microbials in Conventional Livestock Production Annual Review of Animal Biosciences 4, 335-355. 2016.

Bolan et al., Role of inorganic and organic soil amendments on immobilization and phytoavailability of heavy metals: a review involving specific case studies. Aust. J. Soil Res., 41, 533-555. 2003.

Khan et al., Mechanism of Phosphate Solubilization and Physiological Functions of Phosphate-Solubilizing Microorganisms. In: MS Khan. Eds. springer publishers Switzerland. 2014.

Jilani et al., Enhancing crop growth, nutrients availability, economics and beneficial rhizosphere microflora through organic and biofertilisers. Ann. Microbiol. 57, 177-183. 2007.

Kaur et al., Effects of Phosphate-Sollubilizing Bacteria, Rock Phosphate and Chemical Fertilisers on Maize-Wheat Dropping Cycle and Economics. Pedosphere, 25, 428-437. 2015.

Woo et al., Trichoderma-based products and their widespread use in agriculture. The Open Mycology Journal, 2014, 8, (Suppl-1, M4) 71-126.

Foy, Progress and Developments in Adjuvant Use since 1989 in the USA. Pestic. Sci. (1993) 38, pp. 65-76.

* cited by examiner

**loading of *Bacillus* on animal feed pellets**

Fig. 1

Variation in loading of *Bacillus* on animal feed pellets

Fig. 2

COATED PRODUCT FORM

FIELD

The present invention relates to product forms comprising substrates coated with particles carrying active agents, methods of obtaining such product forms, and uses therefor. In particular, the invention relates to product forms comprising inanimate substrates coated with particles carrying active agents in dry particulate form, methods of obtaining such product forms, and uses therefor.

BACKGROUND

The application of active agents to inanimate substrates in an efficient manner has long been problematic and many means of introducing active agents to the environment have been used in the past. A perceived problem of introducing active agents into the environment is that an unacceptably high proportion of them is lost to micro-environments either too quickly through, for example, rapid leaching away from the vicinity of a target organism or target site in the environment or through non-target organisms intercepting the active agent and appropriating much of its benefit before a target organism can reach it.

Certain types of microbes, or biofertilisers, for example fungi and bacteria, can make nutrients more available to plants, and promote plant growth. Live forms cannot be easily added to fertilisers and the manufacturing process may render the live forms non-viable. Certain crops benefit from particular micronutrients and certain soil types and conditions can be improved by the addition of particular micronutrients. The addition of quantities of such micronutrients to standard fertiliser compositions after their manufacture would enable the micronutrients to be tailored to particular growing situations without the need for changes to the manufacture of standard fertiliser compositions, or more than one fertiliser application. The addition of pesticides to fertilisers would also be advantageous.

Pathogens such as *Salmonella* and *Campylobacter* are transmitted along the food chain and serve as a source of concern for livestock producers and food processors. Antibiotics have been included in the diet of animals at sub-therapeutic dose to act as growth promoters (Dibner and Richards, 2005) and to ward off bacterial infection. However, viable alternatives to antibiotics are required to stimulate the natural defence mechanisms of animals, improve the gut microbiota and reduce reliance on the use of antibiotics (Verstegen and Williams, 2002). A balanced gut microbiota prevents colonization of pathogens, produces metabolic substrates (vitamins and short-chain fatty acids) and stimulates the immune system in a non-inflammatory manner.

The use of direct fed microbes (aka probiotics) has become widely accepted as a natural means to promote health for both humans and animals. Today, probiotics are used as health supplements in food and feeds and they are replacing the use of antibiotic growth promotors or chemical supplements in both human and animal feed. The mode of action of these direct fed microbials can include: production of organic acids, which inhibit intestinal pathogens; production of antimicrobials; competitive exclusion; stimulation of immune responses; enzyme activity; and reduction of toxic amines (Buntyn et al., 2016).

In all cases there is an added difficulty of ensuring a uniformity of application of the additional active agent to the substrate.

It is known to control arthropods using electrostatic, tribocharged wax particles, the particles having on their surface or dispersed throughout an entomopathogenic fungus or a pesticide having activity against the particular species of arthropod. For example, GB2481307 describes the control of grain storage arthropods in this way. In addition, EP0888048 describes the control of cockroaches by applying particles having a core of an inert material into a pesticide is absorbed or adsorbed, and surrounded by a wax material. A further pesticide, for example in the form of spores of an entomopathogenic fungus, may be adhere to the outside of such particles. GB2490243 and GB2482900 also describe the use of electrostatic particles of carnauba wax for arthropod control, in which the particles are applied to the arthropod.

There exists a need for an improved product for the distribution of active agents into various environments.

SUMMARY OF THE INVENTION

According to the present invention, there is provided a product form comprising an inanimate substrate comprising i) an active agent; and ii) carrier particles comprising at least an outer surface comprising an organic matter constituent, wherein the said active agent is combined within and/or adhered onto the surface of the carrier particles, the carrier particles a) being in dry, particulate form and carrying at least an electrostatic surface charge and b) being at least substantially uniformly distributed over the outer surface of the inanimate substrate.

It is now found that by applying active agents to inanimate substrates through the use of carrier particles that stick or adhere to the substrate, the active life of the active agent in the environment may be enhanced, typically lengthened, and that lesser amounts of active agent need to be applied in the field. Furthermore, it has now been found possible to coat an inanimate substrate with a substantially uniform coating of active agent which leads to an improved distribution of it into the environment from the inanimate substrate. By making use of the hydrophobicity of a hydrophobic surface or hydrophilicity of a hydrophilic surface or a mixture of hydrophobicity and hydrophilicity of a surface, and of the electrostatic attraction of the carrier particles of use in the invention an efficient carrier system is achieved that is able to carry lesser amounts of chemicals to target environments yet retain effectiveness of purpose therein.

The inanimate substrate may be selected from a prill, a granule, a milled domestic animal food supplement, a compressed or compacted domestic animal food, "straights" animal feed, and a dietary supplement product form. Preferably the inanimate substrate is a fertiliser granule or prill, or compressed or compacted animal feed, for example a pellet. Suitable inanimate substrates of use in the invention include fertiliser prills such as urea fertiliser prills, NPK fertiliser prills, and ammonium nitrate fertiliser prills and mixtures of two or more thereof. For the purposes of the present invention a prill is defined as a pellet or solid globule of a substance formed by the congealing of a liquid during an industrial process. Typically, materials to be prilled are in a solid state at room temperature and a low-viscosity liquid when melted. Prills are formed by allowing drops of the melted prill substance to congeal or freeze in mid-air after, for example, being dripped from the top of a tall prilling tower. Certain agrochemicals such as fertilisers including urea, ammonium nitrate and NPK fertilisers are often supplied in prilled form: such fertilisers are commonly manufactured as prills (Vasant Gowariker et al (2009)). Prills are a neater, simpler form of fertiliser than fertiliser granules and are considered by some to be more suitable for handling, with reduced dust.

The size of the fertiliser prill or granule will typically be in the range of 1-10 mm, preferably 2-5 mm, and very preferably 3-4 mm. Existing farm machinery is designed to handle prills and pellets of this size. However, the prills and granules could be of any size to suite their purpose, and the working of the invention is not dependent on the size of the prills or granules.

Naturally, the skilled addressee will appreciate that the selection of at least one active agent for addition to a fertiliser prill or fertiliser granule of the invention will be determined by the environment in which it is to be added and its perceived end purpose. Where the inanimate substrate is a fertiliser prill or a fertiliser granule, the active agent may be selected from pesticides and biofertilisers such as live bacteria, typically presented in the form of spores, yeasts, typically presented in the form of spores, fungi for aflatoxin management, typically presented in the form of spores, blue green algae, and fungal or bacterial spores of use in the promotion of root and/or shoot growth from germinating seeds and/or enhancing root and shoot growth from germinated seeds and mixtures of two or more thereof. Preferably the active agent is a live biological agent.

Further species of bacteria of potential use in the invention are those that are able to act on inorganic and/or organic substrates different to that of the product form of the invention to release compounds in soluble form from such substrates, for example, phosphorus. Thus, product forms of the invention may also comprise active agents selected from live bacterial spores, yeast spores and fungal spores and the like. Where the product form comprises live bacterial spores, these may be selected from species of the genera: *Alcaligenes, Acinetobacter, Azospirillum, Arthrobacter, Azotobacter, Bacillus, Burkholderia, Enterobacter, Erwinia, Flavobacterium, Paenibacillus, Pseudomonas, Rhizobium, Serratia*, and mixtures of two or more thereof. Suitable species of each of these genera may be selected from *Azospirillum brasilense, Azospirillum fluorescens, Bacillus amyloliquefaciens, Bacillus megaterium, Bacillus coagulans, Bacillus firmis, Bacillus subtilis, Bradyrhizobium japonicum, Burkholderia cepacia, Paenibacillus lautus, Pseudomonas aeruginosa, Pseudomonas aurantiaca, Pseudomonas putida, Pseudomonas pseudoalcaligenes, Pseudomonas fluorescens, Pseudomonas poae*, and *Pseudomonas trivialis, Rhizobium leguminosarum, Serratia entomophilia, Serratia proteamaculans*, and mixtures of two or more thereof. Commonly used bacterial inoculants of use in the invention are commercially available, for example *Rhizobium* inoculants which may be sourced from companies such as BASF and Monsanto BioAg.

Species of *Mycorrhizal* fungi are also capable of augmenting levels of available nutrients in the soil with further organic and inorganic nutrients that are assimilable by a crop plant. Suitable species of *Mycorrhizal* fungi include those that are capable of colonising a host plant's roots, either intracellularly as in arbuscular *Mycorrhizal* fungi (AMF), or extracellularly as in ericoid *Mycorrhizal* (EM) fungi.

Ericoid mycorrhizas (EM) are known to have saprotrophic capabilities and these are thought to enable plants to receive nutrients from not-yet-decomposed materials via the decomposing actions of their ericoid partners.

Thus, where the product form comprises active agents selected from live fungal spores, these may be selected from *Mycorrhizal* fungi of species of the arbuscular *Mycorrhizal* fungi (AMF), ectoMycorrhizal fungi (EcM) and ericoid *Mycorrhizal* (EM) fungi and mixtures of two or more thereof. Live fungal spores may be selected from AMF mycorrhizae of the *Glomus, Gigaspora, Acaulospora* and *Sclerocystis* genera; EcM of the *Basidiomycota, Ascomycota, Zygomycota, Suillus, Boletus, Lactarius, Laccaria, Pisolithus* and *Rhizopogon* genera; and EM of the *Pezizella* genus and mixtures of two or more thereof, depending on where the product form is to be applied and intended end purpose. Examples of *Mycorrhizal* fungi species which may be employed as active agents in product forms of the invention include AMF species selected from *Glomus fasciculatum, G. intraradices, G. claroideum; G. intra, G. clarum, G. brasilianum, G. deserticola, G. monosporus, G. mosseae, G. tortuosum, G, sinuosum, Gigaspora margarita, Gigaspora gigantean, Acaulospora longular*; the EcM species are selected from *Pisolithus tictorus, Laccaria laccata, L. bicolor, Rhizopogon villosuli, R. rubescens, R. fulvigleba, R. luteolus*, and *R. amylopogon*; and the EM species is selected from the *Pezizella* and mixtures of two or more thereof.

Other species of fungus, such as *Trichoderma* species, for example *Trichoderma asperellum* may be employed in product forms of the invention. *Trichoderma* fungal species are capable of making available, and in helping the adsorption of mineral nutrients from the soil such as by solubilising insoluble phosphorus and zinc in the soil. Other capabilities of the fungus include the decomposition of organic matter thereby releasing calcium, potassium, and nitrogen available for plant use. By such capabilities certain *Trichoderma* species can be used to contribute to a balanced fertilisation of plants, such as monocot plants in the field and thereby the requirement for adding large amounts of artificial fertilisers may be reduced by as much as 50% depending on crop type. *Trichoderma* strains are known in the art, for example, Custom Biologicals Inc (USA) produce a biological soil amendment which is comprised of 4 *Trichoderma* species (*T. harzianum, T. viride, T. koningii* and *T. polysporum*). For a complete review of *Trichoderma*-based products and their widespread use in agriculture see Woo et al., 2014.

Further suitable inanimate substrates contemplated for use in the invention include fertiliser granules, milled domestic animal food supplements, such as those selected from rolled grains comprising rolled oats, rolled maize, rolled barley and rolled rye and mixtures of one or more thereof, milled seeds for animal feed, milled seed for human consumption selected from wheat flour, maize flour, and rye flour, milled large grain seeds selected from at least sunflower, pumpkin and mixtures thereof, domesticated animal feed comprising cellulose and/or lignin content, such as bran pellets, feed cubes, feed bricks, feed treats, "straights" animal feed and dietary supplement dosage forms.

Straight feedstuff or "straights" is a term used in relation to animal feed to describe a vegetable or animal product in its natural state, fresh or preserved, and any product derived from the industrial processing thereof, and single organic or inorganic substance, whether or not it contains any additive, intended as such for feeding. Thus the term covers pellets and grains that are used in animal feeds. For example oats, barley, maize, bran and wheat are all "straights".

The size of such foodstuffs and supplements will typically be in the range of 1-20 mm, more typically 1-10 mm, preferably 2-5 mm and most preferably 3-4 mm. The size of rolled gains, straights and seeds will depend on the original size of the grain or seed and the size of prills, straights and granules will in part be determined by the animal to which they will be fed. However, the foodstuffs can be of any size to suit its use.

Examples of conventional additives for increasing fertiliser efficiency from prills and granules comprising product forms of the invention include those that may be sourced from such commercial sources as Incotec Inc., Germains, Bayer CropScience, and BASF. Suitable additives may be selected from commercially available products such as Auxigrow® (Auxein Corp., Lansing, Mich., USA) and Amisorb® (Donlar Corp., Chicago) or the so-called phytochelates described by A. M. Kinnersley in Plant Growth Regul. (1993), 12(3), 207-18, which are thought to influence the availability to the plant of minimal amounts of certain metals such as Zn, Fe, Cu and the like for optimal growth and productivity. Examples of the latter include polymers of L-lactic acid, L-lactoyllactic acid, water-soluble polyaspartates and the like.

Other additives that may be applied to the environment in conjunction with fertilisers include the kinds of adjuvant that are found in conventional commercial agrochemical formulations. Suitable additives for inclusion into and/or onto fertiliser prills and fertiliser granules of the invention may be selected from those described by Chester L. Foy, (1993) and in EP 0357559. Product forms of the invention may further include conventional additives such as agents having wetting, dispersing and de-foaming modes of action. Suitable surface-active compounds are non-ionic, cationic and/or anionic surfactants having good emulsifying, dispersing and wetting properties. Such adjuvants for crop enhancing product forms of the invention are obtainable from fine chemicals producers e.g. by Clariant AG (Muttenz, Switzerland) and include (fatty) alcohol alkylphenol ethoxylates, polyarylphenol ethoxylates, dispersing phosphates, taurides and/or alcohol monosuccinates. The term "surfactants" also comprises mixtures of two or more surfactants and natural or synthetic phospholipids of the cephatin and lecithin series, e.g. phosphatidyl-ethanolamine, phosphatidylserine, phosphatidylglycerol, lysolecithin sugar esters. A typical defoaming agent is Fluowet PL80B® (Clariant AG) and typical antifreeze compounds are glycols and polyethylene glycols. Further ingredients may include solid or liquid substances ordinarily employed in formulation technology, e.g. natural or regenerated minerals, tackifiers, thickeners or binders. Other suitable additives may include emulgating protein hydrolysates, e.g. as described in EP 0297426 (Bayer AG). Dyes may be used in product forms of the invention and include water-insoluble or water-soluble dyes. Examples of dyes that may be added to product forms of the invention include Colanyl Red® (Clariant AG, Muttenz), Rhodamin B, white pigment (titanium dioxide) or Luconyl® (BASF AG). Other special additives which are known to enhance seedling vigour may be used in combination with 3',4',5',6'-tetrachloro-2,4,5,7-tetraiodo-fluorescein (EP0297426), and may be applied to the field environment in a combined amount that is effective, preferably synergistically effective, to increase seedling vigour and plant growth.

Naturally, the skilled artisan will appreciate that for the purposes of the present invention the use of the singular and plural forms for 'prill', 'granule', 'milled domestic animal food supplement', 'compressed or compacted domestic animal food', and 'dietary supplement product form' refer to the same thing unless context demands otherwise.

Product forms of the invention comprising inanimate substrates as defined herein may be used as fertiliser prills or fertiliser granules in agricultural settings to promote the establishment and growth of plants from plant seeds of commercial importance. For the purposes of the present invention it is to be also understood that the terms "seed" and "seeds" herein is used interchangeably unless context demands otherwise. Furthermore, for the purposes of the present invention it is to be also understood that the terms "rolled seed" and "rolled seeds" and "milled seed" and "milled seeds" herein is used interchangeably unless context demands otherwise and refers to seeds and/or seed products that are incapable of germination. Such seeds can be treated e.g. by irradiation or physical processes to mean that they are prevented from germinating. The term "straights" or straight feed encompasses all animal feed in its natural state and any product derived therefrom whether or not is contains any additive.

Rolled seeds and milled seeds of commercial importance of use in the invention include cereal seeds such as rice (*Oryza sativa*), wheat (*Triticum* spp. such as *T. aestivum*) including species such as spelt (*T. spelta*), einkorn (*T. monococcum*), emmer (*T. dicoccum*) and durum (*T. durum*), barley (*Hordeum vulgare*) including two row and six row barley, sorghum (*Sorghum bicolor*), millet species such as pearl millet (*Pennisetum glaucum*), foxtail millet (*Setaria italica*), proso millet (*Panicum miliaceum*) and finger millet (*Eleusine coracana*), oats (*Avena sativa*), rye (*Secale cereale*), Triticale (x *Triticosecale*), buckwheat (*Fagopyrum esculentum*); cotton plant seeds of the family Malvaceae, typically *Gossypium hirsutum* (90% of world cotton production), *Gossypium barbadense* (8% of world cotton production), and *Gossypium arboreum* (2% of world cotton production); seeds of leguminous plants such as seeds of legume species of the family Fabaceae that including species such as Alfalfa (*Medicago sativa*), Austrian winter pea (*Pisum sativum*), Berseem clover (*Trifolium alexandrinum*), Black medic (*Medicago lupulina*), Chickling vetch/pea (*Lathyrus sativus*) Cowpea (*Vigna unguiculata*), Crimson clover (*Trifolium incarnatum*), Field peas (*Pisum sativum* subsp. *arvense*), Hairy vetch (*Vicia villosa*), Horse beans (*Vicia faba*), Kura clover (*Trifolium ambiguum*), Mung beans (*Vigna radiate*), Red clover (*Trifolium pratense*), Soya beans (*Glycine max*), Subterranean clover (*Trifolium subterraneum*), Sunn hemp (*Crotalaria juncea L*), White clover (*Trifolium repens*), White sweet clover (*Melilotus alba*), Woolypod vetch (*Vicia villosa* ssp. *dasycarpa*), Yellow sweet clover (*Melilotus officinalis*), Adzuki bean, (*Vigna angularis*, syn.: *Phaseolus angularis*), Broad bean (*V. faba* var. major), field bean (*Vicia faba*), Vetch (*Vicia sativa*), Common beans (*Phaseolus vulgaris*), including green beans, runner beans, haricot beans and the like, Chick pea (*Cicer arietinum*), Guar bean (*Cyamopsis tetragonoloba*), Hyacinth bean (*Dolichos lablab*), Lentil (*Lens culinaris*), Lima bean (*Phaseolus lunatus*), Lupin (*Lupinus* spp.), Mung bean (*Vigna radiata*, syn.: *Phaseolus aureus*), Pea (*Pisum sativum*), Peanut (*Arachis hypogaea*), Pigeon pea (*Cajanus cajan*), Tepary bean (*Phaseolus acutifolius*) and the like; maize seed from a *Zea mays* plant that is for food-related production or other industrial purpose such as starch production, bio-fuel manufacture, typically ethanol manufacture, animal fodder production and the like. Examples of *Zea mays* varieties used in industry include flour corn (*Zea mays* var. *Amylacea*); popcorn used as a food and in packaging materials (*Zea mays* var. *Evert*); flint corn used for hominy production (*Zea mays* var. *Indurata*); sweet corn used as a food (*Zea mays* var. *saccharata* and *Zea mays* var. *Rugosa*); Waxy corn used in producing food thickening agents, in the preparation of certain frozen foods, and in the adhesive industry (*Zea mays* var. *Ceratina*); Amylomaize maiz used in the production of biodegradeable plastics (*Zea mays*); and striped maize used as an ornamental (*Zea mays* var. *Japonica*). Maize is also known as "corn" and these two terms may be used interchangeably unless context demands otherwise. Also for the purposes of the present invention it is to be understood that the term "field crop plant seed" refers to "oilseeds" and "vegetable seeds" which are collectively referred to herein as "field crop plant seeds" unless context demands otherwise. Field crop plant seeds suitable for coating with compositions of use in the invention include oil seeds of the Crucifer family such as canola (*B. campestris*) and oilseed rape (*B. napus*); seeds of other Crucifer plant species including those of plants of the *B. oleraceae* such as seeds of types of cabbages, broccolis, cauliflowers, kales, Brussels sprouts, and kohlrabis; seeds of alliums including onion, leek and garlic. Other field crop plant seeds suitable for coating with compositions of use in the invention include capsicums, tomatoes, cucurbits such as cucumbers, cantaloupes, summer squashes, pumpkins, butternut squashes, tropical pumpkins, calabazas, winter squashes, watermelons, lettuces, zucchinis (courgettes), aubergines, carrots, parsnips, swedes, turnips, sugar beet, celeriacs, Jerusalem artichokes, artichokes, bok choi, celery, Chinese cabbage, horse radish, musk melons, parsley, radish, spinach, beetroot for table consumption, linseed, sunflower, safflower, sesame, carob, coriander, mustard, grape, flax, dika, hemp, okra, poppy, castor, jojoba and the like; Fodder crop plant seed of use in the invention is seed that may be grown as a stock feed for further processing such as in bio-fuel production, processed animal feed production, field planting for farm animal consumption and the like. For the purposes of the present invention it is to be understood that the term "fodder crop plant seed" refers to fodder crop plant seeds suitable for coating with compositions of use in the invention and includes species of the Poaceae, including *Lolium* spp such as Italian Ryegrass, Hybrid Ryegrass, and rye grasses such as perennial ryegrass (*Lolium perenne*); Festuca species such as red fescue, fescue, meadow fescue, Tall fescue, Lucerne Fescue, and the forage herbs such as chicory, Sheep's Burnett, Ribgrass (aka Robwort Plantain), Sainfoin, Yarrow, Sheep's Parsley and the like. In a preferred embodiment, product forms of the invention comprising inanimate substrates as defined herein may be used as fertiliser prills or fertiliser granules in agricultural settings to promote the establishment and growth of plants from plant seeds of commercial importance selected from wheat, barley, rye, corn (maize), *sorghum*, soya bean, *brassica* spp. such as oilseed rape, for example, canola cultivars, sunflower, cotton, and rice. "Straights" may also be formed from these products.

The term 'Domesticated animal' as used herein includes commercially reared avian and mammalian animals selected from poultry such as chickens, game birds, geese, turkeys and ducks, goats, sheep, alpacas, cattle, horses, pigs, domesticated pet rodents, such as rabbits, gerbils, rats, mice, and hamsters, chinchillas and other vegetarian or omnivorous kinds of commercially important animals.

Carrier particles of use in the invention are commonly selected from electrostatically charged particles (often referred to as 'electrets' in the art). The particles may be charged through the process of manufacturing them, such as through tribocharging. They may also be charged post-manufacture, also for example through tribocharging, or through any other convenient means. Carrier particles of use in the invention may be selected from particles typically comprising natural waxes, synthetic waxes, and mineral waxes and mixtures of two or more thereof, and having a melting point of ≥40° C. Suitable waxes of use in the invention include a mixture of one or more waxes having a melting point of preferably ≥50° C., and most preferably are made up of hard waxes having a melting point of ≥70° C. Typically, the carrier particles will be solid wax particles, i.e. made of wax throughout, or made of wax and an active agent throughout and with or without an active agent on the outer surface thereof.

Carrier particles of use in the invention may also comprise polymers such as polyethylene and polypropylene, biopolymers selected from soluble and insoluble starches, proteinaceous compounds such as chitin.

Waxes suitable for use in the invention include paraffin wax, beeswax, carnauba wax, lanolin, Chinese wax, spermaceti wax, shellac wax, bayberry wax, sugar cane wax, ozocerite, ceresin wax, montan wax, myricyl palmitate, cetyl palmitate, candelilla wax, castor wax, microcrystalline wax, ouricury wax, sugar cane wax, wool wax, retamo wax, rice bran wax, polyethylene wax, polypropylene wax and mixtures of two or more thereof.

Carrier particles of use in this aspect of the invention may have a median diameter of up to 300 μm, preferably from 5 μm to 300 μm, more preferably from 10 μm to 200 μm, for example from 20 μm to 40 μm, such as 25, 26, 27, 28, 29, 30, 31, 32, 33, 34, 35, 36, 37, 38, 39, or 40 μm and any size thereinbetween. They may have a volume mean diameter of ≥5 μm or ÷10 μm. Preferably the particles will have a volume mean diameter in the range from 5 μm to 100 μm. The active agent is present on or in the substrate in a ratio of 1:99 to 99:1 wt. %. Typically when a chemical active agent is added to a wax in this way the quantity of agent added will be 1-2%, although the active agent may be added in quantities of 5-10%. Where the active agent is added after formation of the wax, typically the weight of the chemical agent will be 1-20%, preferably 5-10%. Where the active agent is a live biological agent typically the ratio of wax particles of live biological agent will be 1:99 to 99:1. Typically the active will be present at a rate of 10-50% and preferably 20-40%.

Particle size is suitably measured using methods and apparatus recognized as standard in the art. Particle sizing in dispersions can be accomplished using a variety of techniques, including laser diffraction, dynamic light scattering (DLS), disc centrifugation, and light microscopy. All of these techniques have their advantages and limitations. Laser diffraction relies on a well-controlled presentation of the sample to the measurement region and is limited to samples with narrow range of particle concentrations. Dilution is often required and this may affect the particle size, particularly in compounds with high solubility. Examples of sizing equipment are made by Malvern Instruments (UK), using laser diffraction methods, or the 900 series by Cilas Instrumentation. For highly irregular particles, the diameter refers to the greatest diameter in any dimension even if the particle is relatively non-spherical.

More specifically, the volume mean diameter of the particles is typically measured using a dry powder laser diffraction particle size analyser such as the Malvern Mastersizer or Sympatec Helos series instruments. A suitable quantity of dry particles is placed into a vibratory feed hopper of such instrument and blown into and through the flow path of the lasers. The volume mean diameter of the particles is thereby calculated. The X50 can be measured using the Cilas 900 series.

The carrier particles of use in the invention may comprise layered particles, for example they may have a metallic core such as a magnetic metal core, or a core made up of an inorganic powder such as kaolin or talc, or a core made of a suitable substance that is inert with respect to the outer layer of particles of use in the invention, such as rubber.

Such particles consisting of a core that is not a material that is similar to the material of the outermost external layer of particles of use in the invention will have an external hydrophobic layer or an external hydrophilic layer or an external layer comprised of hydrophilic and hydrophobic components that is capable of making available to the ambient environment at least one active agent from a product form of the invention. Particles of use in the invention may or may not comprise a layered structure comprising a core as described above. Typically, the external layer of carrier particles of use in the invention is made up of a natural, synthetic, or mineral wax or a mixture of two or more thereof. Such waxes making up the hydrophobic layer typically have a melting point ≥40° C. or ≥50° C., more preferably a melting point above of ≥60° C. or preferably ≥70° C. Such particles will typically have a volume mean diameter as set out above. Preferably, particles of the invention comprise solid wax particles, that is to say, particles that are made up of at least one wax that do not have cores consisting of other materials other than waxes that are selected from one or more species of waxes from the group consisting of natural, synthetic and mineral waxes.

Synthetic waxes of use in the invention include suitable waxes selected from paraffin wax, microcrystalline wax, Polyethylene waxes, Fischer-Tropsch waxes, substituted amide waxes, polymerized α-olefins and the like.

Mineral waxes of use in the invention include those mineral waxes offered under the brand name Luwax® (BASF), montan wax, ceresin wax, ozocerite, peat wax and the like.

The skilled addressee will appreciate that where waxes of use in the invention are destined for application to inanimate surfaces designed for consumption by animals and/or humans the added waxes are typically selected from edible waxes such as carnauba wax, rice bran wax and the like. The skilled addressee will also appreciate that where waxes of use in the invention are destined for application to inanimate surfaces of items not designed for nutritional purposes for animals, such as fertiliser granules and prills, waxes are typically selected from synthetic and mineral waxes such as montan wax, polyethylene waxes and waxes sold under the brand name Luwax® (BASF) and the like. However, any wax can be combined with any inanimate substrate. Preferably the particles are solid wax particles wherein the active agent is combined within and/or on the surface of the wax particles.

The carrier particles of use in the invention may also contain suitable excipients commonly employed in the art such as flow agents or anti-caking agents selected from sodium bicarbonate, sodium ferrocyanide, potassium ferrocyanide, calcium ferrocyanide, bone phosphate, sodium silicate, silicon dioxide, calcium silicate, magnesium trisilicate, talcum powder, sodium aluminosilicate, potassium aluminium silicate, calcium aluminosilicate, bentonite, aluminium silicate, stearic acid, polydimethylsiloxane and the like. Additionally, carrier particles of use in the invention may contain other components such as additives selected from UV blockers such as beta-carotene or p-aminobenzoic acid, colouring agents such as optical brighteners and commercially available colouring agents, such as food colouring agents, plasticisers such as glycerine or soy oil, antimicrobials such as potassium sorbate, nitrates, nitrites, propylene oxide and the like, antioxidants such as vitamin E, butylated hydroxyl anisole (BHA), butylated hydroxytoluene (BHT), and other antioxidants that may be present, or mixtures thereof. The skilled artisan will appreciate that the selection of such commonly included additives will be made depending on end purpose, and perceived need.

Other additives may be employed in carrier particles of the invention including bioregulators commonly applied in the art such as brassinosteroids, cytokinines e.g. kinetin or zeatin, the auxins e.g. indolylacetic acid or indolylacetyl aspartate, the flavonoids and isoflavanoids e.g. formononetin or diosmetin, the phytoaixins e.g. glyceolline, phytoalexin-inducing oligosaccharides such as pectin, chitin, chitosan, polygalacuronic acid and oligogalacturonic acid, compounds such as the gibellerins produced by rhizobial symbionts and endophytic microorganisms such as *Acetobacter diazotrophicus* and *Herbaspitillum seropedicae* and the like.

In a further preferred embodiment of the invention, there is provided use of carrier particles comprising solid wax particles, that is to say, particles that are made up of at least one wax that do not have cores consisting of other materials other than waxes that are selected from one or more species of waxes from the group consisting of natural, synthetic and mineral waxes. Typically, waxes of use in the invention have a melting temperature of ≥20° C. Suitable waxes of use in the invention include waxes having a melting point of preferably ≥50° C., and most preferably are made up of hard waxes having a melting point of ≥70° C. Examples of natural waxes of use in the present invention include carnauba wax, beeswax, Chinese wax, shellac wax, spermaceti wax, myricyl palmitate, cetyl palmitate, candelilla wax, castor wax, ouricury wax, wool wax, sugar cane wax, retamo wax, rice bran wax and mixtures of two or more thereof.

Synthetic solid waxes of use in the present invention include suitable waxes selected from paraffin wax, microcrystalline wax, Polyethylene waxes, Fischer-Tropsch waxes, substituted amide waxes, polymerized α-olefins and the like.

Mineral solid waxes of use in the invention include those mineral waxes offered under the brand name Luwax® (BASF), montan wax, ceresin wax, ozocerite, peat wax and mixtures of two or more thereof. The skilled addressee will appreciate that where solid waxes of use in the invention are destined for application to inanimate surfaces designed for consumption by animals and/or humans the added waxes are typically selected from edible waxes such as carnauba wax, rice bran wax and the like. The skilled addressee will also appreciate that where solid waxes of use in the invention are destined for application to inanimate surfaces of items not designed for nutritional purposes, such as fertiliser granules and prills, added waxes are typically selected from synthetic and mineral waxes such as montan wax, polyethylene waxes and waxes sold under the brand name Luwax® (BASF) and the like.

Where a product form of the invention comprises an inanimate substrate selected from a milled domestic animal food supplement, a compressed or compacted domestic animal food, "straights" animal feed and a dietary supplement product form, the carrier particles may be presented thereto by mixing the formed animal food product, such as a brick, pellet, cube or biscuit, with particles loaded with appropriate active agents, such as vitamins, antibiotic compounds (for increasing muscle mass), amino acids, such as essential amino acids, peptides, polypeptides, proteins, bacterial spores, yeast spores, fungal spores, probiotics and mixtures of two or more thereof. In a preferred embodiment, the active agent is selected from amino acids, peptides, polypeptides, proteins, vitamins, bacterial spores, for example *B. subtilis* spores available under Enviva® PRO (Dupont), yeast spores, fungal spores, probiotics such as *Lactobacillus* species and bifidobacteria species and mixtures of two or more thereof and as herein defined. In an alternative, a product food form of the invention may be produced by i) selecting carrier particles of use in the invention and loading them with active agents of choice, ii) adding the particles of i) to an edible substrate, and iii) optionally compressing or compacting the product of ii) into a solid product form such as a brick, pellet, cube or biscuit. In such a food form, carrier particles of use in the invention are comprised within and on the surface of the food form. In such a manner, the active agent of choice is uniformly spread within the food form and uniformly available on the surface thereof and so is more efficiently presented to the gut of an animal ingesting the food form A product form of the invention may be in the form of a dietary supplement product form for human and/or veterinary use, such as a pill or a tablet. It is well known in the art how to make such product forms.

The product form according to the invention comprises carrier particles having a median diameter of up to 300 µm, preferably from 5 µm to 300 µm, more preferably from 10 µm to 200 µm, for example from 20 µm to 40 µm, such as 25, 26, 27, 28, 29, 30, 31, 32, 33, 34, 35, 36, 37, 38, 39, or 40 µm and any size thereinbetween. They may have a volume mean diameter of ≥5 µm or ≥40 µm. The most preferred volume mean diameter will be in the range from 5 µm to 100 µm. Such particles may be obtained by kibbling, comminuting and air milling particles to a desired volume mean diameter using conventional procedures.

In a further aspect of the invention there is provided a method of producing carrier particles of use in the invention made up of solid waxes comprising:
i) mixing at least one active chemical agent with carrier particles in a ratio of 1:99 to 99:1 wt. %;
ii) placing the mixture of step i) in an autoclave and adding liquid $CO_2$ under high pressure (10-100 bars);
iii) mixing the components of step ii) in liquid form under constant high temperature (50-200° C.) and constant high pressure (10-100 bars) for a time period sufficient to complete mixing of all the components (10-600 minutes);
iv) expanding the gas saturated product solution of step iii) through an aperture under high pressure into a spray receptacle; and
v) cooling the product of step iv) to below the solidification temperature of the carrier particles forming fine particles.

This method of preparing carrier particles including an active chemical agent is known as the PGSS (Particles from Gas Saturated Solutions) process.

The ratio of active chemical agent mixed with carrier particles in step i) may lie in the range 10:90 to 90:10 wt %, preferably in the range 20:80 to 80:20 wt %, and most preferably in the range 30:70 to 70:30 wt %.

The mixing step iii) is conducted at a constant high temperature and high pressure for a time interval or period sufficient to ensure complete mixing of all the components.

Once the components of step iii) are thoroughly mixed, they are then released from the autoclave and into a spray receptacle at a pressure higher than that employed in step iii).

In a further aspect of the invention there is provided a method of producing a product form of the invention from carrier particles of the invention comprising adding the particles of v) to an inanimate substrate as defined herein.

Where the active agent to be added to fine particles of the invention is selected from live biological agents such as fungal spores, bacterial spores, yeast spores, blue-green algae spores and the like, the method of producing particles of use in the invention is not able to be carried out under high pressure and high temperature.

Thus, in a further aspect of the invention there is provided a method of producing carrier particles comprising a live biological agent of use in the invention made up of solid waxes comprising:
i) placing carrier particles in an autoclave and adding liquid $CO_2$ under high pressure;
ii) expanding the gas saturated product solution of step i) through an aperture under high pressure into a spray receptacle;
iii) cooling the product of step ii) to below the solidification temperature of the carrier particles forming fine expanded wax particles (termed 'exploded particles' hereinafter) and
iv) mixing at least one live biological agent of choice with the fine particles of iii) at a temperature and pressure that does not substantially affect the viability of the biological agent of choice in a ratio of 1:99 to 99:1 wt % in a mechanical mixing device for a time period sufficient to complete mixing of all the components.

Preferably, the temperature and pressure of step iv) is approximately room temperature and standard pressure, respectively.

In a further aspect of the invention there is provided a method of producing a product form of the invention comprising adding carrier particles comprising at least one live biological agent of choice by adding the particles obtained by the preceding method to an inanimate substrate as defined herein.

The ratio of active chemical agent mixed with carrier particles in step i) lies in the range 10:90 to 90:10 wt %, preferably in the range 20:80 to 80:20 wt %, and most preferably in the range 30:70 to 70:30 wt %.

In step ii) of the method of producing carrier particles of use in the invention, the expansion step ii) is conducted at a temperature in the range 50° to 200° Centigrade and a pressure in the range 10 to 100 bar, such as 10-30 bar, in an autoclave. Preferably, the mixing step iv) is conducted at a temperature in the range 20° to 40° Centigrade and at standard pressure. Typically, the mixing step iv) is conducted at room temperature of 25° Centigrade +/−10° C. and at standard pressure, that is to say, ambient atmospheric pressure.

The mixing step iv) is conducted from 10 minutes to 600 minutes depending on design, and is sufficient to ensure complete mixing of all the components.

The active agent in the above aspects of the invention may be selected from micronutrients, macronutrients, amino acids, peptides, polypeptides, proteins, vitamins, antibiotics, bacterial spores, for example *B. subtilis* spores available under Enviva® PRO (Dupont), yeast spores, fungal spores, viruses, probiotics such as *Lactobacillus* species and bifidobacteria species and mixtures of two or more thereof and as herein defined. In a preferred embodiment, the active agent is selected from amino acids, peptides, polypeptides, proteins, vitamins, bacterial spores, for example *B. subtilis* spores available under Enviva® PRO (Dupont), yeast spores, fungal spores, viruses, probiotics such as *Lactobacillus* species and bifidobacteria species and mixtures of two or more thereof and as herein defined.

In some cases particles may contain both one or more chemical agents and one or more live biological agents. In such cases the chemical agent(s) will typically be incorporated into the wax before forming particles, such as in the methods described above. The live biological agent(s) may then be added to the outside of the particles, again as set out in the methods above.

Alternative methods may be used for producing the carrier particles of the invention. In particular carrier particles of solid wax material may be made from blocks of solid wax material. For example, 1 to 5 kilogram blocks or tablets may be broken up or kibbled into small millimetre-sized pieces (such as from 2 mm-8 mm approximate diameter in size, for example from 4 mm to 6 mm) in a kibbling machine. The millimetre-sized pieces can then be passed through a comminuting means such as a standard mill, e.g. an Apex Comminuting mill, and milled or comminuted into particles having an approximate diameter in the range from 100 μm-500 μm, for example from 250 μm-300 μm. The micron-sized comminuted particles can then be passed through a micronising apparatus, such as an AFG micronising air mill to obtain particles of a desired VMD range, such as from 15 μm-20 μm, that is of use in the present invention. The skilled addressee will appreciate that such procedures for obtaining small particles are well known in the art. The particles may have a size as described above, in particular a volume mean diameter of ≥5 μm or ≥10 μm. The most preferred volume mean diameter will be in the range from 5 μm to 100 μm. The active agent, in dry powder form, may be added to the particles after their formation resulting in adherence of the active to the outside of the particles. Typically live biological agents are added in this way. However, chemical agents as escribed above, may also be added to the outside of the particles.

Active agents may also be incorporated into the wax particles. The active agent may be added to molten wax which is then solidified encapsulating the active agent. The active agent may be dissolved or distributed throughout the molten wax. The wax is then solidified and formed into particles as described above. This results in particles in which the active agent is distributed within and on the surface of the particles. While it will typically be chemical agents that are dispersed throughout the particles, live active agents may also be so distributed if they are able to withstand the conditions used in the formation of the particles and in particular the melt temperature of the wax. For example viruses may be incorporated into the wax particles in this way.

Particles may be produced having one active agent distributed throughout the particles, i.e. within and on the surface of the particles, and another active agent added to the surface of the particles after formation. This further active agent may be a chemical agent or a live biological agent.

Typically when a chemical active agent is added to a wax in this way the quantity of agent added will be 1-2%, although the active agent may be added in quantities of 5-10%. Where the active agent is added after formation of the wax, typically the weight of the chemical agent will be 1-20%, preferably 5-10%. Where the active agent is a live biological agent typically the ratio of wax particles of live biological agent will be 1:99 to 99:1. Typically the active will be present at a rate of 10-50% and preferably 20-40%.

In a further aspect of the invention there is provided use of electrostatic carrier particles in dry particulate form, the particles comprising at least one active agent (i.e. a biological and/or a chemical agent) as defined herein in coating an inanimate substrate as defined herein, wherein the active agent is combined within and/or on the surface of the carrier particles. Carrier particles of use in this aspect of the invention may have a median diameter of up to 300 μm, preferably from 5 μm to 300 μm, such as from 10 μm to 200 μm, say from 10 μm to 40 μm or any value thereinbetween for example 25, 26, 27, 28, 29, 30, 31, 32, 33, 34, 35, 36, 37, 38, 39, or 40 μm. They may have a volume mean diameter of ≥5 μm, ≥10 μm. The most preferred volume mean diameter will be in the range from 5 μm to 100 μm. The active agent is present on the substrate in a ratio of 1:99 to 99:1 wt. %.

The active agent in this use aspect of the invention may be selected from micronutrients, macronutrients, amino acids, peptides, polypeptides, proteins, vitamins, antibiotic compounds, bacterial spores for example *B. subtilis* spores available under Enviva® PRO (Dupont), yeast spores, fungal spores, viruses, probiotics such as *Lactobacillus* species and bifidobacteria species and mixtures of two or more thereof and as herein defined. In a preferred embodiment, the active agent is selected from amino acids, peptides, polypeptides, proteins, vitamins, bacterial spores, for example *B. subtilis* spores available under Enviva® PRO (Dupont), yeast spores, fungal spores, viruses, probiotics such as *Lactobacillus* species and bifidobacteria species and mixtures of two or more thereof.

The substrate in this use aspect of the invention may be selected from a prill, a granule, a milled domestic animal food supplement, a compressed or compacted domestic animal food, and a dietary supplement product form as herein defined.

In yet a further aspect of the invention there is provided use of an inanimate substrate selected from a prill, a granule, a milled domestic animal food supplement, a compressed or compacted domestic animal food, "straights" animal feed and a dietary supplement product form in the manufacture of a product form as herein defined. The inanimate substrate may be selected from a fertiliser prill, a fertiliser granule, a milled domestic animal food supplement selected from rolled grain such as rolled oats, rolled maize, rolled barley and rolled rye and mixtures of one or more thereof, milled seed for animal feed, "straights" animal feed, milled seed for human consumption selected from wheat flour, maize flour, and rye flour, milled large grain seeds selected from at least sunflower, pumpkin and mixtures thereof, domesticated animal feed comprising cellulose and/or lignin content, and a dietary supplement dosage form.

There now follow figures and experimental methods. It is to be understood that the teaching of the figures and the examples is not to be construed as limiting the invention in any way.

EXAMPLES

The invention is illustrated in the following examples, with reference to the accompanying drawings, in which:

Figure 1:
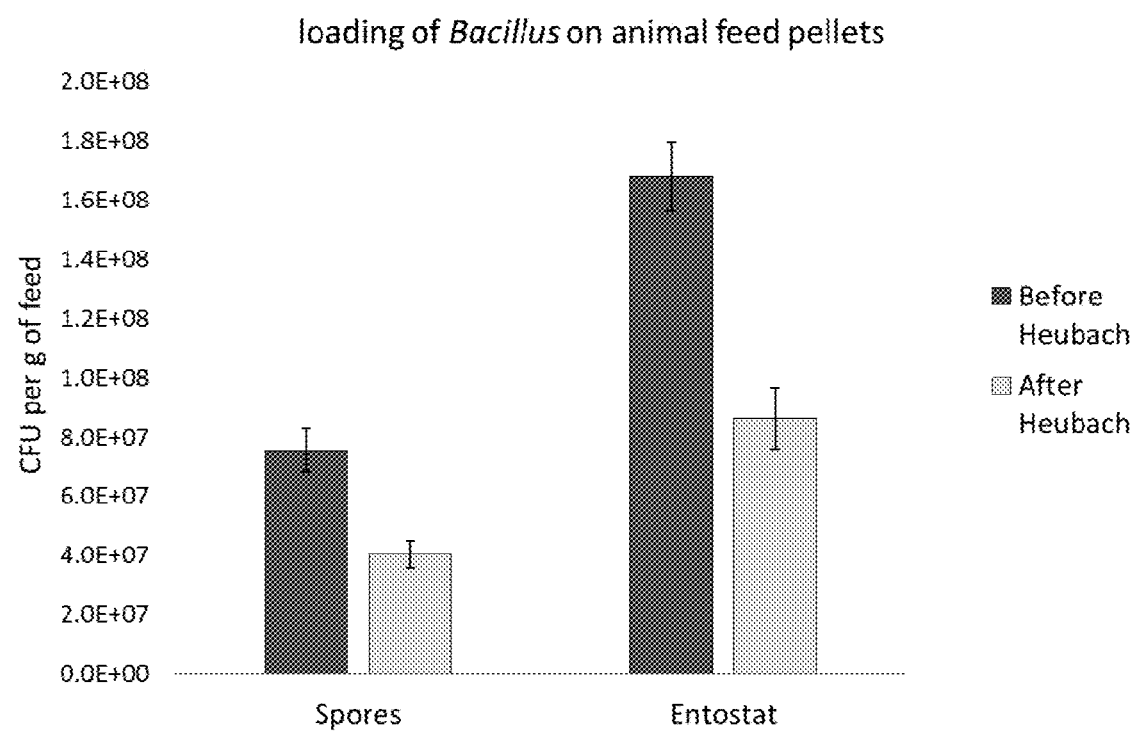

FIG. 1 shows the loading of *Bacillus* onto pellets was two-fold higher in the Entostat® treatment group, compared to the group where spores only were applied;

FIG. 2 shows that *Bacillus* spores were more uniformly distributed on pellets in the Entostat® treatment group, compared to the group where spores only were applied;

FIG. 3 is a photograph of NPK fertiliser pellets prior to addition of Entostat®;

FIG. 4 is another photograph of the NPK fertiliser pellets of FIG. 3;

FIG. 5 is a photograph of the NPK fertiliser pellets after addition of Entostat® (carnauba variety);

FIG. 6 is another photograph of the NPK fertiliser pellets after addition of Entostat® (carnauba variety);

FIG. 7 is a photograph of the NPK fertiliser pellets after addition of Entostat® (polyethylene variety);

FIG. 8 is a photograph of Polyhalite Sirius fertiliser prior to addition of Entostat®;

FIG. 9 is a photograph of the Polyhalite Sirius fertiliser after addition of Entostat® (carnauba variety);

OBJECTIVES

Figure 3:
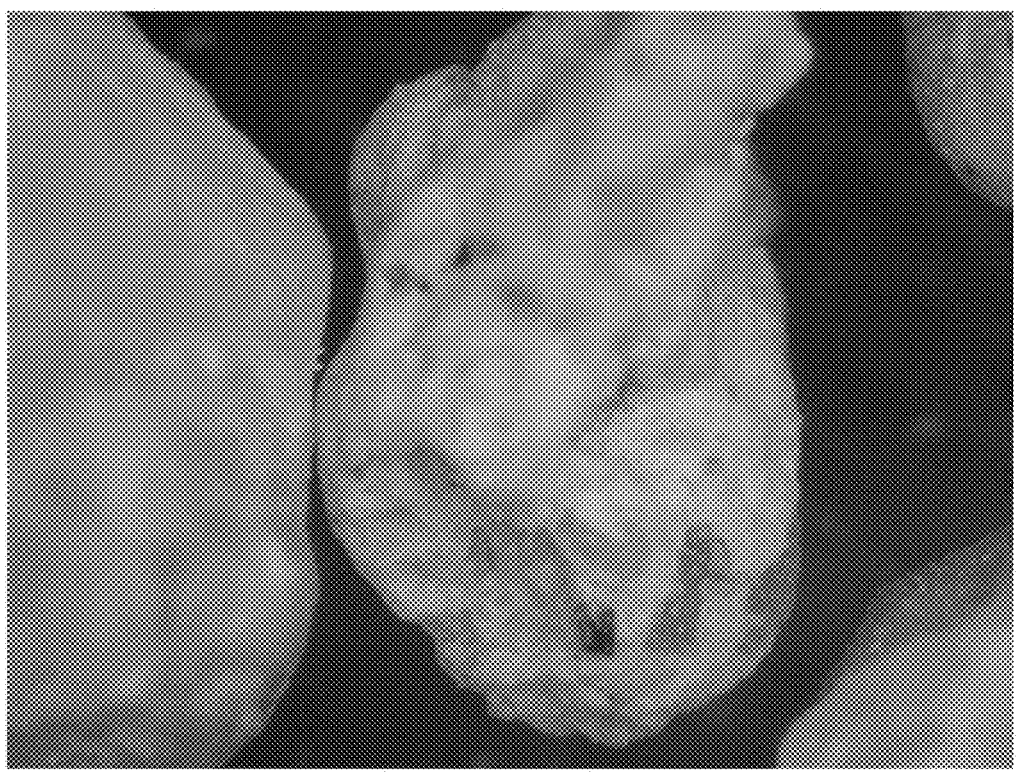

To demonstrate that inputs (biological or chemical) applied to a substrate (e.g. fertiliser prills/animal feed pellets) using Entostat® carrier (electrostatically charged) in a dry powder formulation are more uniformly distributed on the substrate (e.g. fertiliser prills/animal feed pellets) compared to application of inputs alone (e.g. spores only), or inputs in a typical dry powder formulation (e.g. spores in a Talc formulation or a chemical compound in a powder formulation).

Introduction and Study Outline

Direct inoculation of a substrate (e.g. fertiliser prills/animal feed pellets) allows inputs such as nutrient use efficiency bacteria or probiotics to be applied directly to the substrate (e.g. fertiliser prills/animal feed) closer to the point of use. While the ability of the inputs to stick to the substrate is critical, even distribution of inputs is also vital. Uneven distribution of inputs may result in variation in their efficacy, as some plants or animals fail to receive the minimum effective dose while other plants or animals receive significantly more inputs than are actually required.

Entostat® can be made from a range of micronized waxes, as discussed above, and has been developed as a carrier for bacteria, fungi, viruses and chemistries. Previous results have demonstrated that Entostat® facilitates better placement of biological and chemical input as the tribocharged Entostat® waxes adhere to the seeds and arthropods. The purpose of this study is to demonstrate that when applied to an inanimate substrate (e.g. fertiliser/animal feed) that the wax, and therefore the input, is also more uniformly distributed on the substrate compared to unformulated technical grade inputs. The tribocharged Entostat® wax used in this study is carnauba wax, unless otherwise stated.

The Heubach Dustmeter is designed to simulate the mechanical stress associated with handling and distributing. This equipment was used in this study to establish the adhesion of test material to the substrate following mechanical stress.

Example 1

Application of a Probiotic/Direct Fed Microbe to Domesticated Animal Feed Comprising Cellulose and Lignin Content Test & Reference Item Details

| | |
|---|---|
| Test items | 25% Bacillus subtilis spores (strain PY79) combined with 75% Entostat ® (1:3 w/w). Applied at a rate of 0.5000 g formulation per kg of animal feed pellet (substrate). Bacillus subtilis (strain PY79) was provided by Sporegen, UK. Entostat ® (carnauba) wax particles had a median diameter (X50) of 30 µm. Formulations were prepared at Exosect facilities by mixing the ingredients in a random orbital powder blender (e.g. turbula T10), with a blending time 1-8 hours. |
| Reference items | 100% Bacillus subtilis (strain PY79) without a carrier (i.e. pure spores) |

Substrate—Animal Feed Pellets

TABLE 1

Animal feed details

| Animal Feed | Variety | Source | Batch Number |
|---|---|---|---|
| Pellet | Pasture cubes | Dodson & Horrell, Northamptonshire, UK | (12) 26C 105224 |

Experimental Design

Bacillus subtilis spores, formulated with Entostat®, were tested against unformulated Bacillus subtilis spores. There were 12 experiments, within each experiment there was 2-3 (bottles) per treatment (spores v Entostat®). For the purpose of analysis, experiment is the replicate (n=12). Treatments were mechanically stressed in the Heubach Dustmeter in a fully randomised order.

The rate of spore material was kept at a constant 0.125 g per kg of animal feed in all formulations, which was equivalent to approximately $1.625 \times 10^8$ spores per g of animal feed.

TABLE 2

Experimental treatments

| Formulation | Ratio spores to carrier (w/w) | Spore rate (g per 500 g pellets) | Carrier rate (g per 500 g pellets) | Formulation rate (g per 500 g pellets) |
|---|---|---|---|---|
| Entostat ® | 1:3 | 0.0625 | 0.1875 | 0.2500 |
| Spores only | 1:0 | 0.0625 | 0.00 | 0.0625 |

Treatments were weighed into sterile 1 L Duran bottles along with 500 g of animal pellets. Prior to use, the animal pellets had been equilibrated for a minimum of 48 hours at 20° C. After application of the treatment to the pellets the contents of the Duran bottles were homogenised for 30 seconds by gently agitating the bottles using the Stuart Rotator with MIX2040 attachment. Two pellets (approx. weight 0.3000-0.6000 g) were removed from each 500 g batch and placed into individual empty dilution bottles for enumeration to give a measure of adhesion before mechanical stress ('Before Heubach'). One 100 g sample was removed from each 500 g batch to undergo mechanical stress (Heubach).

The 100 g sample was mechanically stressed in the Heubach Dustmeter (Heubach GmbH, Heubachstrasse7, 38685 Langelsheim). Samples were poured into the drum of the Heubach. Heubach settings were: rotation speed 30 rpm, rotation time 120 seconds and airflow rate 20 l/min. A vacuum pump created an air flow through the rotating drum, the connected glass cylinder and the attached filter unit. Abraded dust particles were transported out of the drum via the air flow, through the glass cylinder, and subsequently through the filter unit. Coarse non-floating particles were separated and collected in the glass cylinder while the floating dust particles were deposited onto a filter. After the cycle period (120 seconds), treated pellets were removed from the rotating drum. Two pellets (approx. weight 0.3000-0.6000 g) were taken from each sample (bottle) and placed into individual empty dilution bottles for Colony Forming Unit (CFU) enumeration to give a measure of adhesion after mechanical stress ('After Heubach'). Work involving the Heubach Dustmeter was conducted between 20° C. and 25° C. and 30% and 70% relative humidity.

Sampling/Measurement Regime

CFU Enumeration

For each treatment, the four pellets collected for assessment (2 before and 2 after Heubach) were individually weighed and each of the individual pellets were transferred in a sterile 15 mL centrifuge tube containing 10 mL of sterile 5% Tween 80. In order to detach the spores from the pellet, the pellet was left to soak in this solution for 20 minutes. The disintegrated pellet was then suspended by vortexing for 30 seconds followed by sonicating for 3 minutes. From this solution 1 mL of the spore suspension was pipetted into a sterile vial containing 9 mL of dH$_2$O (D1 dilution). To create a serial dilution 1 mL of D1 was pipetted into a sterile vial containing 9 mL of dH$_2$O (D2 dilution). 1 mL of the D2 dilution was then pipetted to a sterile vial containing 9 mL of 0.05% Tween solution (D3 dilution).

The number of CFUs per pellet was determined using the spread plate method. Nutrient agar plates (9 cm petri dishes containing 25 mL agar per plate) containing Cycloheximide (40 mg/L agar) were inoculate with 0.1 μL of each dilution using a sterile pipette (spread plate method). Cycloheximide was added to the agar prior to plate pouring (agar temp <50° C.) to reduce fungal contamination. The rate of cycloheximide (40 mg/L agar) was as per supplier recommendation (Thermo Scientific). Agar plates used to culture the bacteria were poured at least 4 hours prior to inoculation and incubated at room temperature (approx. 20° C.) to ensure that bacteria were not exposed to high temperatures. For each pellet 3 agar plates were inoculated for each dilution (D1-D3). Post inoculation, plates were incubate at 30° C. for 24 hours, until discrete colonies were distinguishable, after which time colonies were counted to determine the loading (CFU per g of pellet). Only plates with between 20 and 400 CFU's per plate were used in the assessment (minimum 3 plates used to generate an average value per treated pellet). CFU counts were conducted on treated pellets collected before and after the Heubach Test. Within each experiment, counts for each set of two pellets were averaged to generate a single value per bottle for pre and post Heubach.

The standard deviation (SD) is a measure that is used to quantify the amount of variation in a set of data values. A low standard deviation indicates that the data points tend to be close to the mean or average value of the set, while a high standard deviation indicates that the data points are spread out over a wider range of values. To compensate for possible differences between sample means (i.e. loading rates) relative variation can be expressed as the coefficient of variation. The coefficient of variation (CV), also known as relative standard deviation (RSD), is a standardized measure of dispersion which shows the extent of variability in relation to the mean of the population. Coefficient of variation is calculated according to the following equation:

$$Cv = \frac{\sigma}{\mu}$$

Where CV=coefficient of variation, σ=standard deviation and μ=sample mean

The lower the coefficient of variation value, the more uniform the distribution on the pellet. Where coefficient of variation is expressed as a percentage, a value of 0% indicates complete uniformity/zero variation.

Results

The loading of *Bacillus* onto the pellet was twice as high in the Entostat® treatment, compared to where the spores only were applied ($1.7\times10^8$ CFU per g compared with $7.6\times10^7$ CFU per g). This ratio was not influenced by mechanical stress.

TABLE 3

The coefficient of variation (CV) for the number of *Bacillus* spores per g of animal feed

| Formulation | Before Heubach (% variation) | After Heubach (% variation) |
|---|---|---|
| Spores only | 32.6 | 42.5 |
| Entostat ® & spores | 25.4 | 23.2 |

Even with a mixing time of just 30 seconds ('Before Heubach') spores were more uniformly distributed on the fertiliser prill where Entostat® was used as a carrier: variation in the Entostat® treatment was 22% lower than in the spores only treatment (coefficient of variation in spores only was 32.6, compared to 25.4% in the Entostat® treatment). Once pellets were subjected to mechanical stress (Heubach), which included an additional 120 seconds mixing time, the mixing time/adding mechanical stress actually decreased the uniformity in the spores only treatment (coefficient of variation rose from 32.6 to 42.5%, respectively). Conversely, increasing the mixing time/adding mechanical stress did not have an effect on the distribution of the bacteria on the animal feed pellets where the bacteria were formulated with Entostat® (coefficient of variation 25.4 and 23.2%). If we compare the distribution after mechanical stress ('After Heubach'), the bacteria were almost twice as uniform when delivered with Entostat® as when delivered as pure spores (coefficient of variation 42.5 and 23.2%, respectively). This result demonstrates that Entostat® formulations deliver a more uniform distribution.

The coefficient of variation data was non-normal in distribution, so was transformed (square root transformation) prior to analysis using a two-way ANOVA, with Heubach and Formulation as main effects. Formulation significantly affected how uniform the bacteria were distributed onto the animal feed pellets (F=4.104, df=1, P=0.0489), though mechanical stress (Heubach) did not (F=0.062, df=1, P=0.8045). There was no interaction between the main effects (F=0.897, df=1, P=0.3487).

Example 2

Application of Phosphate-Solubilizing Bacteria to Fertiliser Prills

Phosphorus is one of the major nutrients required for plant growth, however, much of the phosphorus in the soil is unavailable to plants. Chemical fertilisers are commonly used to fill this deficiency, though restrictions around the use of chemical fertilisers are becoming common (e.g. E.U. Drinking water directive and Water Framework directive). Bolan and Duraisamy (2003) outlined how phosphate solubilizing bacteria (PSB) play a significant part in phosphorus nutrition by improving phosphorus accessibility to the plants through the release of organic and inorganic soil phosphorus pools by mineralization and solubilisation. Specifically, improved accessibility of phosphorus can be achieved by the microorganism increasing the solubility of inorganic phosphorus compounds; mineralizing organic compounds with release of inorganic phosphate; converting inorganic phosphate into cell components, and; oxidation or reduction of organic phosphorus compounds. Microorganisms which are known to be capable of solubilizing phosphate include certain bacteria (e.g. *Alcaligenes, Burkholderia, Enterobactor, Pseudomonas* and *Bacillus*) and fungi (e.g. *Aspergillus, Fusarium, Penicillium* and *Rhizopus*) (Khan et al., 2014).

In field experiments conducted on maize investigating the integrated use of chemical, organic and biofertilisers, Jilan et al (2007) concluded that integration of half dose of chemical (NP) fertiliser with biofertilisers (including *Bacillus* sp.) can give similar crop yield as with full rate of the chemical fertiliser. In a study on wheat and maize, Kaur and Reddy (2015) reported that soil fertility, in the context of available P, enzyme activities and phosphate-solubilizing bacteria population, was significantly improved when phosphate-solubilizing bacteria were applied in conjunction with rock phosphate fertiliser, compared to plots which received a chemical P fertiliser (diammonium phosphate, DAP). The authors concluded that the combined use of the bacteria and rock phosphate was also more economical. Co-delivery of biofertilisers and chemical fertilisers may therefore offer opportunities to increase crop yields with reduce fertiliser inputs, especially given the increasingly stringent environmental compliance standards growers must now comply with in terms of where and when fertilisers can be applied.

Test & Reference Item Details

| | |
|---|---|
| Test items | 25% *Bacillus subtilis* spores (strain PY79) are combined with 75% Entostat ® (1:3 w/w) and applied at a rate of 0.5000 g formulation per kg of fertiliser prill (substrate). *Bacillus subtilis* (strain PY79) is sourced from Sporegen, UK. Entostat ® (carnauba) wax particles have a median diameter (X50) of 30 µm. Formulations are prepared at Exosect facilities by mixing the ingredients in a random orbital powder blender (e.g. turbula T10), with a blending time 1-8 hours. |
| Reference items | 100% *Bacillus subtilis* (strain PY79) without a carrier (i.e. pure spores) |

Substrate—Fertiliser Prills

Fertiliser prills were acclimatised at room temperature for at least 48 hours prior to testing. Details of the prills used are in Table 4.

TABLE 4

Fertiliser Prill details

| Fertiliser Type | Variety | Source |
|---|---|---|
| Urea Prill | Krista | Yara, UK |

Experimental Design

*Bacillus subtilis* spores, formulated with Entostat®, are tested against unformulated spores (Table 5). The Entostat® formulation was applied at 0.0625 g per 500 g batch of prills, to give the same application weight as the unformulated spores. There were two experiments, and within each experiment there were 12 replicates per treatment (500 g batches). The two experiments used different batches of spores and formulations.

The rate of formulation was kept at a constant 0.125 g per kg of fertiliser prill. This was equal to $1.63 \times 10^8$ CFU/g fertiliser prills for the 'spores only' treatment and $0.41 \times 10^8$ CFU/g fertiliser prills for the Entostat® 1:3 formulation.

TABLE 5

Experimental treatments

| Formulation | Ratio spores to carrier (w/w) | Application rate (g per 500 g fertiliser) |
|---|---|---|
| Entostat ® | 1:3 | 0.0625 |
| Spores only | 1:0 | 0.0625 |

Fertiliser prills were sieved using a 425 micron sieve before each experiment to reduce the amount of dust produced by the prills during the mechanical process. Treatments were weighed into 10 mL weighboats and transferred to sterile 1 L Duran bottles containing 500 g of sieved fertiliser prills. The treatments were homogenized for 30 seconds by gently agitating using the Stuart Rotator with MIX2040 attachment. One 100 g sample was removed from each 500 g batch.

The 100 g sample is mechanically stressed in the Heubach Dustmeter (Heubach GmbH, Heubachstrasse7, 38685 Langelsheim). Samples are poured into the drum of the Heubach. Heubach settings are: rotation speed 30 rpm, rotation time 120 seconds and airflow rate 20 L/min. A vacuum pump creates an air flow through the rotating drum, the connected glass cylinder and the attached filter unit. Abraded dust particles are transported out of the drum via the air flow, through the glass cylinder, and subsequently through the filter unit. Coarse non-floating particles are separated and collected in the glass cylinder while the floating dust particles are deposited onto a filter. Work involving the Heubach Dustmeter was conducted at room temperature. After the mechanical stress cycle, treated fertiliser prills were removed from the rotating drum. Fifteen fertiliser prills (1 replicate) were removed from each 100 g batch and placed into individual empty dilution bottles for enumeration.

CFU enumeration was conducted on treated fertiliser prills collected after the Heubach Test. For each treatment, fifteen fertiliser prills per replicate were collected for assessment and transferred in a sterile 15 mL centrifuge tube containing 10 mL of sterile 5% Tween 80. In order to detach the spores from the prill, the prills are left to soak in this solution for 20 minutes, after which time the centrifuge tube is vortexed for 30 seconds. From this solution 1 mL of the spore suspension is pipetted into a sterile vial containing 9 mL of $dH_2O$ (D1 dilution). To create a serial dilution 1 mL of D1 is pipetted into a sterile vial containing 9 mL of $dH_2O$ (D2 dilution). 1 mL of the D2 dilution is then pipetted to a sterile vial containing 9 mL of 0.05% Tween solution (D3 dilution).

The number of CFUs per fertiliser prill are determined using the spread plate method. Nutrient agar plates (9 cm petri dishes containing 25 ml agar per plate) containing Cycloheximide (40 mg/L agar) are inoculated with 0.1 µL of each dilution using a sterile pipette (spread plate method). Cycloheximide is added to the agar prior to plate pouring (agar temp <50° C.) to reduce fungal contamination. The rate of cycloheximide (40 mg/l agar) is as per supplier recommendation (Thermo Scientific). Agar plates used to culture the bacteria were poured at least 4 hours prior to inoculation and incubated at room temperature (approx. 20° C.) to ensure that bacteria are not exposed to high temperatures. For each fertiliser prill 3 agar plates are inoculated for each dilution (D1-D3). Post inoculation, plates are incubated at 30° C. for 24 hours, until discrete colonies are distinguishable, after which time colonies are counted to determine the loading (CFU per g of pellet). Only plates with between 20 and 400 CFU's per plate are used in the assessment (2-3 plates used to generate an average value per treated prill). The CFU values in the Entostat® formulation were multiplied by 4 to correct for a different application rate to the unformulated spores.

The standard deviation (SD) is a measure that is used to quantify the amount of variation in a set of data values. A low standard deviation indicates that the data points tend to be close to the mean or average value of the set, while a high standard deviation indicates that the data points are spread out over a wider range of values. To compensate for possible differences between sample means (i.e. loading rates) relative variation can be expressed as the coefficient of variation. The coefficient of variation (CV), also known as relative standard deviation (RSD), is a standardized measure of dispersion which shows the extent of variability in relation to the mean of the population. Coefficient of variation is calculated according to the following equation:

$$Cv = \frac{\sigma}{\mu}$$

Where CV=coefficient of variation, σ=standard deviation and μ=sample mean

The lower the coefficient of variation value, the more uniform the distribution on the pellet. Where coefficient of variation is expressed as a percentage, a value of 0% indicates complete uniformity/zero variation.

Results

Coefficient of Variation

The Entostat® formulation had a lower coefficient of variation than unformulated spores in experiment 1 and experiment 2 (Table 6).

TABLE 6

Coefficient of variation between the replicates in experiment 1 and 2 after mechanical stress created by the Heubach Dust Meter

| | Coefficient of variation (%) | |
|---|---|---|
| Experiment | Spores (0.0625 g) | Entostat ® (0.0625 g) |
| 1 | 111.451 | 53.718 |
| 2 | 71.793 | 35.633 |

If we compare the distribution after mechanical stress (Table 6), the bacteria were twice as uniform when delivered with Entostat® as when delivered as pure spores, a trend that was repeated across both experiments (Experiment 1 coefficient of variation 54%% and 111%; Experiment 2 36% versus 72%). This result demonstrates that Entostat® formulations deliver a more uniform distribution.

Example 3

Application of Wax Particles to a Variety of Substrates

While Heubach is a useful test for quantitatively demonstrating the uniformity of adherence of carrier particles to an inanimate substrate such as a fertiliser prill or animal feed pellet, it is an aggressive technique that results in the destruction of many prills, pellets and granules. The test is designed to simulate the effects of mechanical handling and distribution of the substrates, such as application to a field, but is generally more aggressive, leading to greater damage to the prills, pellets or granules than is typically observed. Another way of demonstrating the uniformly of the adherence of the carrier is by photographing coated prills, pellets and granules under a microscope.

Experimental Design

Entostat® was added to several types of fertiliser and animal feed as substrates set out below in Table 7. The Entostat® varieties and VMD are set out in Table 8, and the application rates are set out in Table 9. The Entostat® was added at a rate as set out below in Table 9. The Entostat® was weighted into sterile 1 L Duran bottle along with the substrate, and the contents of the bottles were shaken gently for approximately 30 seconds to distribute. A quantity of the substrate was then placed in a small dish and photographed under a microscope.

TABLE 7

Fertilisers compositions

Substrate

Fertiliser pellets comprising 10% nitrogen, 2% phosphorous, 5% potassium, 2% MgO and 2% Fe, and obtained from by Progreen Weed Control.
Mineral granules comprising 14% K2O, 19% Sulphur, 6% MgO, 17% CaO, sold under the name Polyhalite Sirus and obtained from by Sirius Minerals
Polyhalite Sirus-http://siriusminerals.com/polyhalite/poly4-explained/
Urea prills comprising 46% nitrogen, and obtained from by Yara UK Limited.
Prilled Urea Yara-http://www.yara.co.uk/crop-nutrition/fertiliser/nitrate/0149-yarabela-prilled-n/
Animal feed pellets comprising wheatfeed, nutritionally improved straw, barley, cane molasses, wheat, maize, limestone flour, peas, oatfeed, vegetable oil, salt, extracted sunflower, mint (0.8%), vitamin/trace mineral premix, garlic granules (0.5%), dried carrots (0.5%), calcined magnesite, l-lysine. The product is sold under the name "Pasture mix" for feeding to horses and ponies, and was obtained from Dodson & Horrell.

TABLE 8

Entostat ® varieties and size

| Entostat ® Variety | Size (VMD) |
|---|---|
| Carnauba | 24.89 μm |
| Polyethylene | 7.40 μm |
| Polyethylene* | 8.01 μm |
| Rice bran | 10.08 μm |

The wax was loaded onto the pellets, granules and prills as set out in the table below, using the Fig. number for identification.

TABLE 9 loading of wax onto substrate

| Fig. No. | Substrate | Wax | Loading Rate |
|---|---|---|---|
| 3 | NPK fertiliser pellets | — | |
| 4 | NPK fertiliser pellets | — | |
| 5 | NPK fertiliser pellets | carnauba | 500 g substrate + 0.1875 g wax |
| 6 | NPK fertiliser pellets | carnauba | 500 g substrate + 0.1875 g wax |
| 7 | NPK fertiliser pellets | polyethylene | 10 g substrate + 0.1 g wax |
| 8 | Polyhalite Sirius granules | — | |
| 9 | Polyhalite Sirius granules | carnauba | 500 g substrate + 0.1875 g wax |
| 10 | Urea prills | — | |
| 11 | Urea prills | carnauba | 500 g substrate + 0.1875 g wax |
| 12 | Urea prills | carnauba | 500 g substrate + 0.1875 g wax |
| 13 | Urea prills | polyethylene | 10 g substrate + 0.1 g wax |
| 14 | Animal feed pellets | — | |
| 15 | Animal feed pellets | carnauba | 15 g substrate + 0.1 g wax |
| 16 | Animal feed pellets | polyethylene* | 500 g substrate + 0.1875 g wax |
| 17 | Animal feed pellets | polyethylene | 15 g substrate + 0.1 g wax |
| 18 | Animal feed pellets | rice bran | 500 g substrate + 0.1875 g wax |

Results

Figure 4:
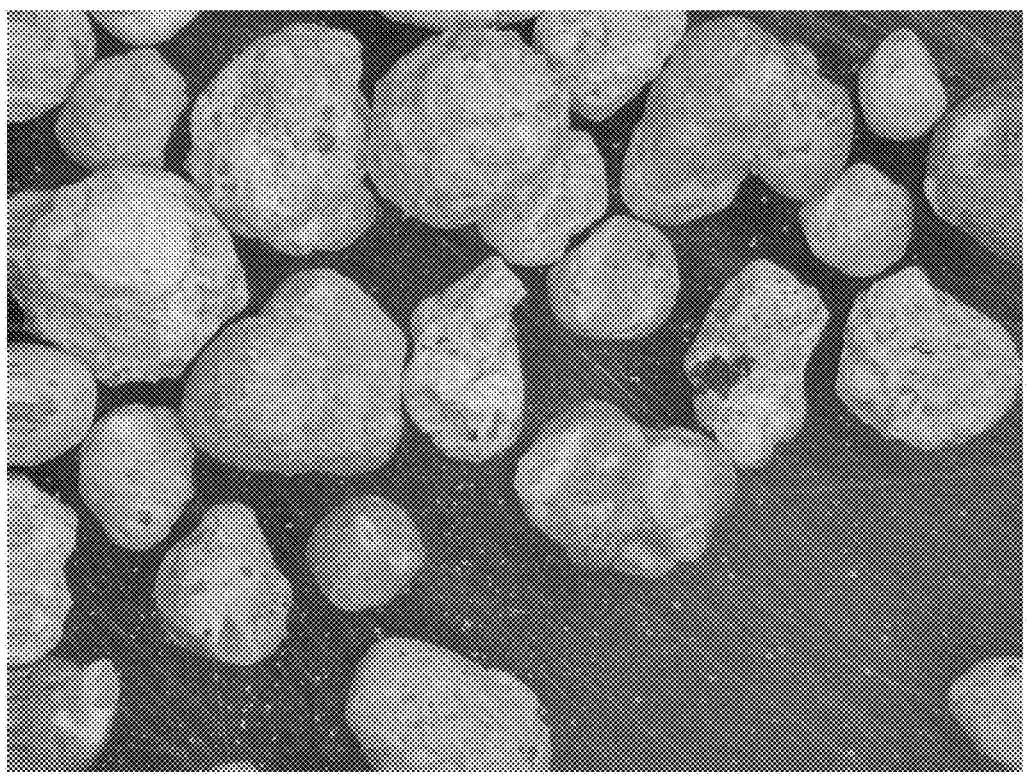
Figure 5:
Figure 6:
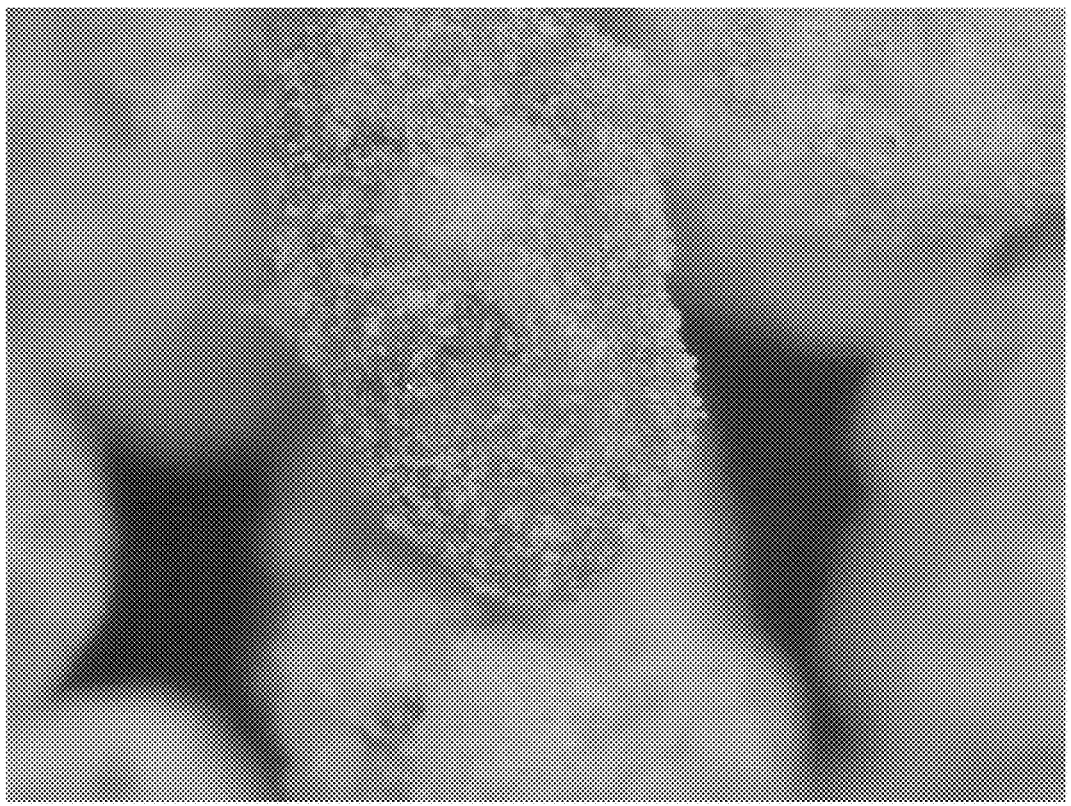
Figure 7:
Figure 8:
Figure 9:
Figure 10:
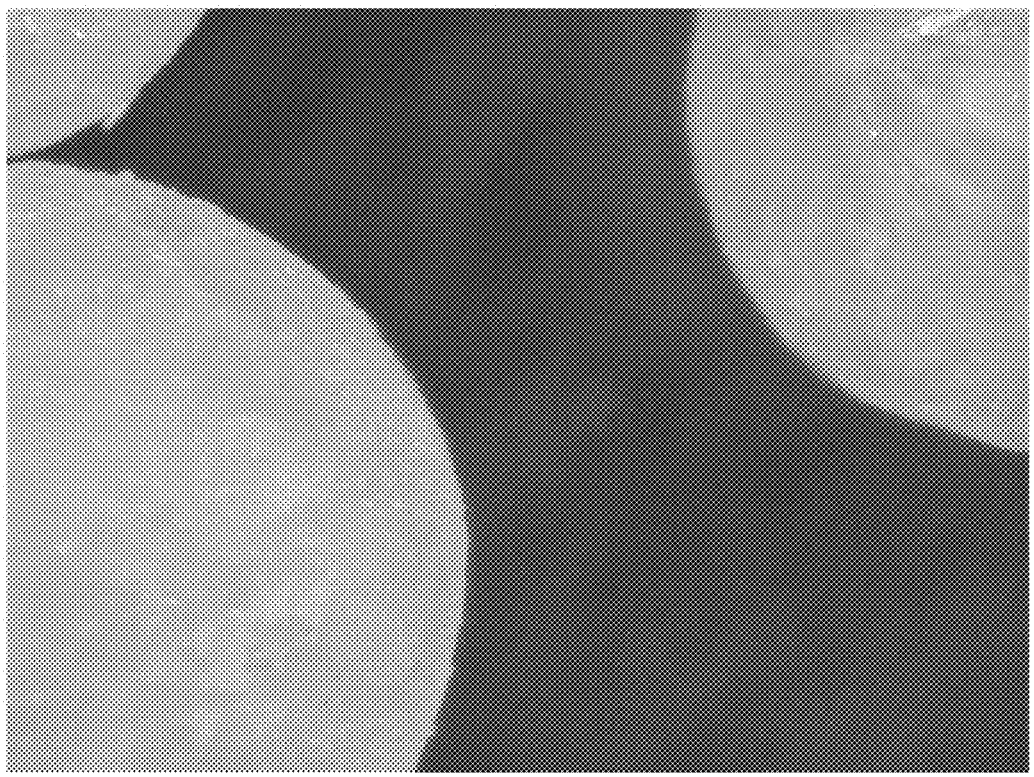
FIG. 10 is a photograph of urea fertiliser prills prior to addition of Entostat®.
Figure 11:
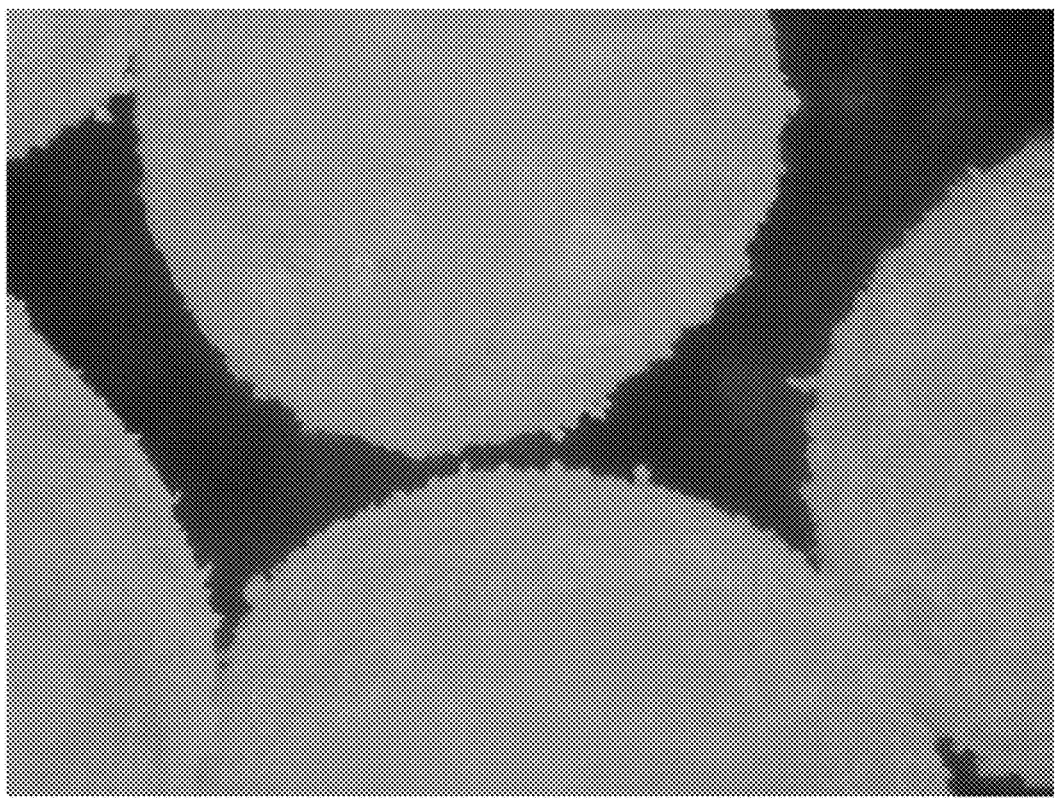
FIG. 11 is a photograph of the urea fertiliser prills after addition of Entostat® (carnauba variety)
Figure 12:
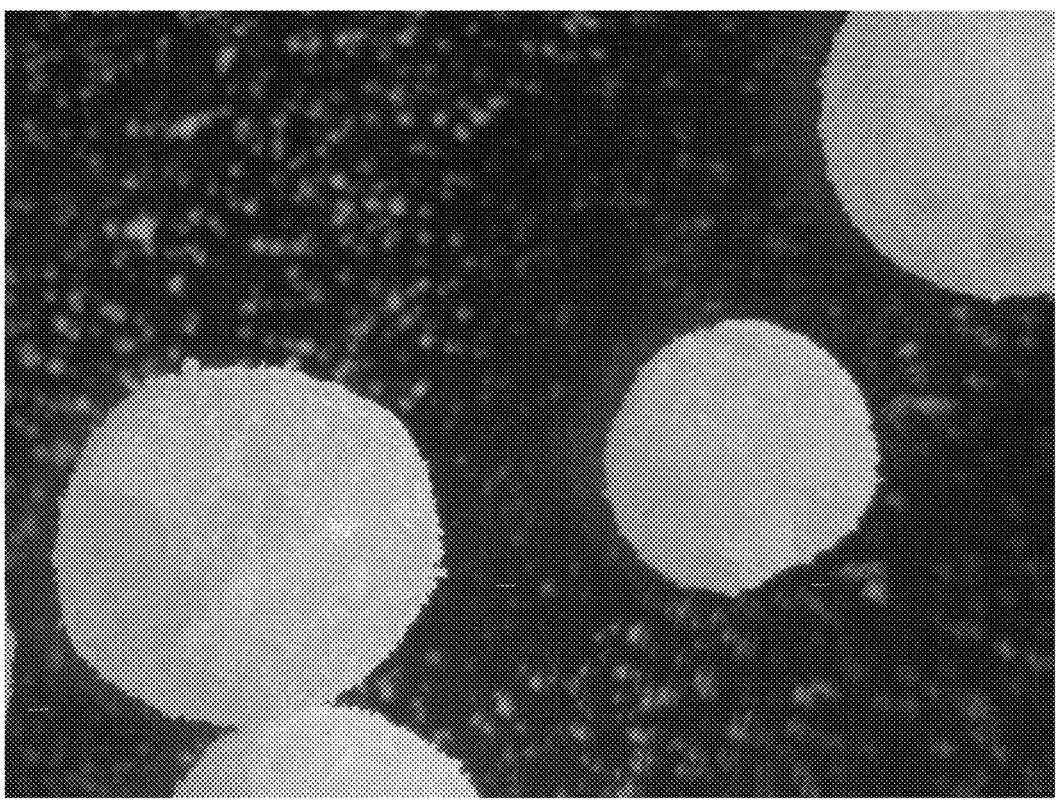
FIG. 12 is another photograph of the urea fertiliser prills after addition of Entostat® (carnauba variety)
Figure 13:
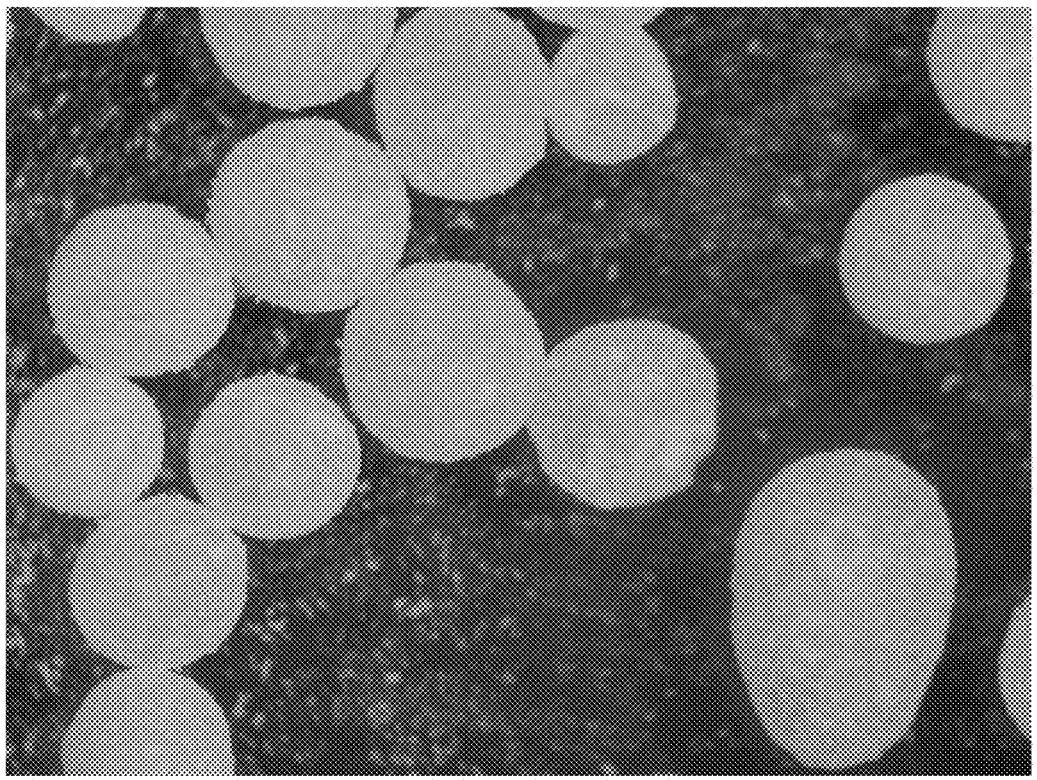
FIG. 13 is a photograph of the urea fertiliser prills after addition of Entostat® (polyethylene variety)
Figure 14:
FIG. 14 is a photograph of animal feed pellets prior to addition of Entostat®.
Figure 15:
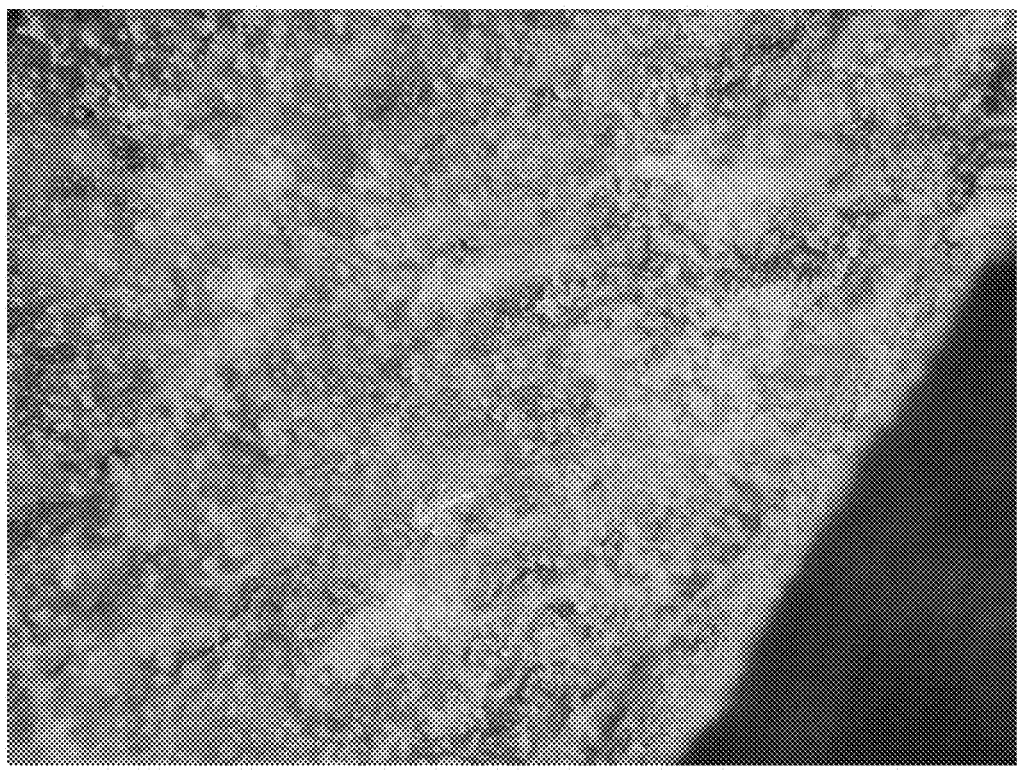
FIG. 15 is a photograph of animal feed pellets after addition of Entostat® (carnauba variety)
Figure 16:
FIG. 16 is a photograph of animal feed pellets after addition of Entostat® (polyethylene* variety)
Figure 17:
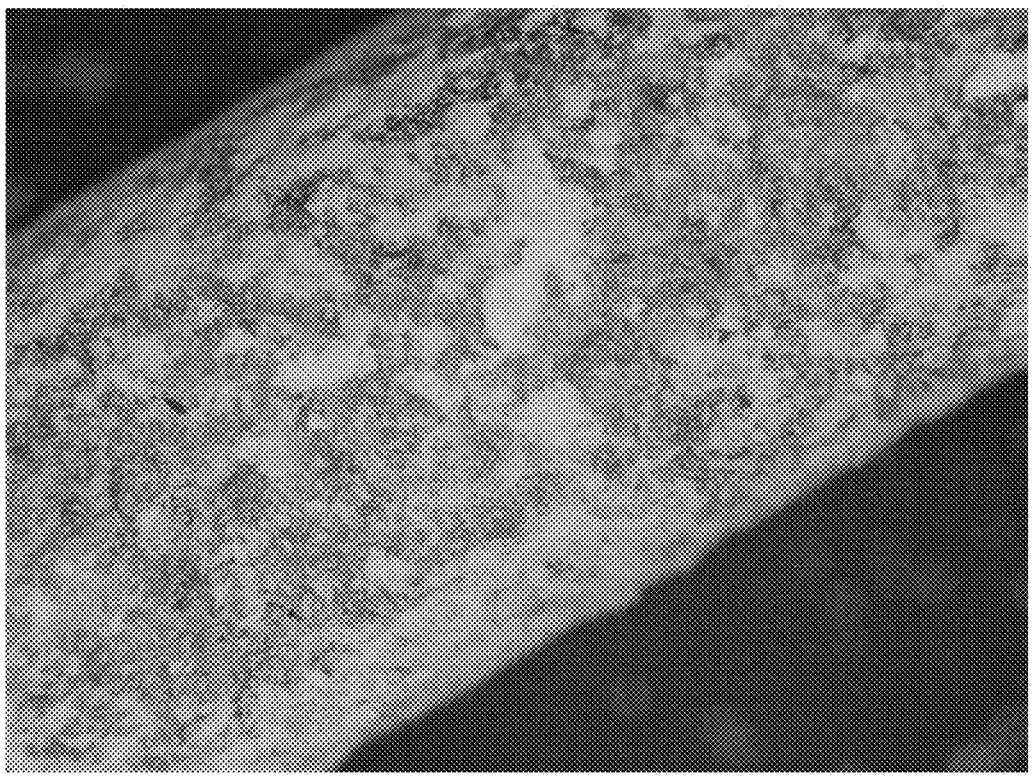
FIG. 17 is a photograph of animal feed pellets after addition of Entostat® (polyethylene variety)
Figure 18:
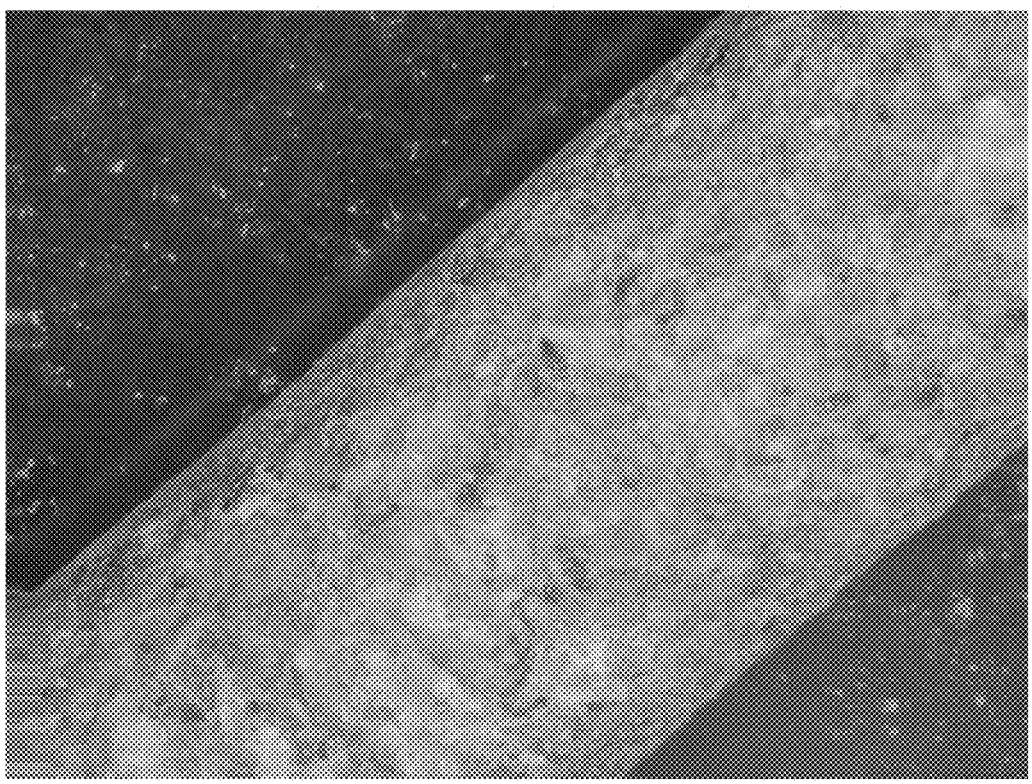
FIG. 18 is a photograph of animal feed pellets after addition of Entostat® (rice bran variety).

The photographs are shown in FIGS. 3-18. As can be seen the simply act of gently shaking the pellets, granules and prills with the Entostat® results in a uniform distribution of the Entostat® over the surface of the prills and pellets. Importantly the distribution is substantially uniform over the surface of each pellets, granule or prill and over the mass of pellets, granules and prills.

This experiment demonstrates that Entostat®, namely electrostatic wax particles made from a range of different types of wax, adheres to a variety of different substrates, namely fertilizer pellets, granules and prills and animal feed pellets, providing a substantially uniform coating across the substrate. Thus Entostat® is able to be used to append a range of chemicals, micronutrients and biological agents to the substrates that enables them to be tailored to their particular use, namely soil type, soil condition, intended use of soil, particular animal or condition of animal. This is not possible using mass manufacture as generally it would not be possible to incorporate live biological agents into these substrates as the live agents would not survive the manufacturing process, and the different range of chemicals, including pesticides for example, and micronutrients that can be added is too broad for commercial manufacturing.

Additional Protocol

| | |
|---|---|
| Test items | 30% *Beauvaria bassiana* spores combined with 70% Entostat ® - paraffin wax variety (3:7 w/w). Applied to milled maize kernels at a rate of 0.500 g formulation per kg. Entostat ® has a median diameter (X50) of 15 μm. Formulations were prepared at Enosect facilities by mixing the ingredients in a random orbital powder blended, with a blending time of 1 hour. |

Results

After mixing the kernels were viewed under a microscope and a uniform distribution of the particles over the milled kernels was observed.

The invention hence provides product forms comprising substrates uniformly coated with particles carrying active agents, methods of obtaining such product forms, and uses thereof.

REFERENCES

Dibner, J. J. and J. D. Richards. 2005. Antibiotic growth promoters in agriculture: history and mode of action. Poultry Science, 84, 634-643

Mathur, S. and R. Singh. 2005. Antibiotic resistance in food lactic acid bacteria. A review. International Journal of Food Microbiology, 105, 281-295.

Salyers et al., 2004 Human intestinal bacteria as reservoirs for antibiotic resistance genes. TRENDS in Microbiology Vol. 12 No. 9 September 2004

Verstegen, M. W., and B. A. Williams. 2002. Alternatives to the use of antibiotics as growth promoters for monogastric animals. Anim. Biotechnol., 13, 113-127.

Buntyn, J. O., Schmidt, T. B., Nisbet, D. J. and T. R. Callaway, 2016. The Role of Direct-Fed Microbials in Conventional Livestock Production. Annual Review of Animal Biosciences 4, 335-355

Bolan, N. S. and P. Duraisamy. 2003. Role of inorganic and organic soil amendments on immobilization and phytoavailability of heavy metals: a review involving specific case studies. Aust. J. Soil Res., 41, 533-555.

Khan, S., Zaidi, A. and Ahmad, E. 2014. Mechanism of Phosphate Solubilization and Physiological Functions of Phosphate-Solubilizing Microorganisms. In: M S Khan. Eds. springer publishers Switzerland Jilani et al., 2007. Enhancing crop growth, nutrients availability, economics and beneficial rhizosphere microflora through organic and biofertilisers. Ann. Microbiol. 57, 177-183

Kaur, G. and Reddy, M. S. 2015. Effects of Phosphate-Solubilizing Bacteria, Rock Phosphate and Chemical Fertilisers on Maize-Wheat Cropping Cycle and Economics. Pedosphere, 25, 428-437

Woo, S. L., Ruocco, M., Vinale, F., Nigro, M., Marra, R., Lombardi, N., Pascale, A., Lanzuise, S., Manganiello, G. and Lorito, M. 2014. *Trichoderma*-based products and their widespread use in agriculture. The Open Mycology Journal, 2014, 8, (Suppl-1, M4) 71-126.

Chester L. Foy, Pestic. Sci. (1993) 38, pp. 65-76

Vasant Gowariker et al (2009). The Fertiliser Encyclopedia. John Wiley & Sons. ISBN 9780470410349

The invention claimed is:

1. A product form, comprising an inanimate substrate comprising i) an active agent; and ii) carrier particles comprising at least an outer surface comprising an organic matter constituent, wherein the said active agent is combined within and/or on the surface of the carrier particles, the carrier particles being a) in dry, particulate form and carrying at least an electrostatic surface charge, and b) being at least substantially uniformly distributed over the outer surface of the inanimate substrate, wherein the substrate is a fertiliser prill and wherein the active agent comprises a chemical pesticide or a biofertiliser, or a mixture thereof.

2. A product according to claim 1, wherein the biofertiliser comprises live bacteria, yeasts, fungi for aflatoxin management, blue green algae, live bacterial spores, yeast spores, fungal spores of use in the promotion of root and/or shoot growth from germinating seeds and/or enhancing root and shoot growth from germinated seeds, or mixtures of two or more thereof.

3. A product according to claim 1, wherein the carrier particles are particles comprising natural waxes, synthetic waxes, mineral waxes having a melting point of ≥50° C., polymers, biopolymers, soluble or insoluble starches, proteinaceous compounds, chitin, waxes, paraffin wax, beeswax, carnauba wax, lanolin, shellac wax, bayberry wax, sugar cane wax, ozocerite, ceresin wax, montan wax, candelilla wax, castor wax, microcrystalline wax, ouricury wax, rice bran wax, polyethylene wax, polypropylene wax, or mixtures of two or more thereof.

4. A product according to claim 1 wherein the active agent comprises live bacterial spores, yeast spores or fungal spores.

5. A product according to claim 1, wherein the particles have a median diameter of from 5 μm to 300 μm.

6. A method of producing a product form comprising
i) mixing carrier particles comprising at least an outer surface comprising an organic matter constituent, said carrier particles being in dry, particulate form and carrying at least an electrostatic surface charge, with at least one active agent comprising a chemical pesticide or a biofertiliser, or a mixture thereof, in a ratio of 1:99 to 99:1 wt. %; and
ii) adding the particles of i) to a substrate comprising a fertilizer prill to produce the product form wherein the active agent is combined within and/or on the surface of the carrier particles, and wherein the carrier particles are at least substantially uniformly distributed over the outer surface of the substrate.

7. A method according to claim 6, wherein the ratio of step i) is at least about 30:90 wt %.

8. A method according to claim 6, wherein the biofertiliser comprises live bacteria, yeasts, fungi for aflatoxin management, blue green algae, live bacterial spores, yeast spores, fungal spores of use in the promotion of root and/or shoot growth from germinating seeds and/or enhancing root and shoot growth from germinated seeds, or mixtures of two or more thereof.

9. A method according to claim 6, wherein step ii) comprises the substrate.

10. The method according to claim 6, wherein the carrier particles have a median diameter from 5 μm to 300 μm.

11. A product form comprising fertiliser prills, live biological agent and solid wax carrier particles wherein
the carrier particles are adhered to the prills, the agent is adhered to the carrier particles, and the carrier particles are in dry form, carry an electrostatic surface charge and are at least substantially uniformly distributed over the outer surface of the fertiliser prills.

12. A product according to claim 11, wherein the carrier particles have a volume mean diameter in the range of 5-100 μm.

13. A product according to claim 11, wherein the solid wax carrier particles have a melting point of 50° C.

14. A product according to claim 11, wherein the size of the prills is in the range of 1-10 mm.

15. A product according to claim 11, wherein the solid wax particles further comprise a chemical agent dispersed within the solid wax particles.

16. A product according to claim 11, wherein the carrier particles have a volume mean diameter in the range of 5-100 μm.

* * * * *